(12) United States Patent
Young et al.

(10) Patent No.: US 8,725,682 B2
(45) Date of Patent: May 13, 2014

(54) DISTRIBUTION AND SYNCHRONIZATION OF DIGITAL OBJECTS

(76) Inventors: Daniel J Young, Cleveland, OH (US); Andrew Craze, Shaker Heights, OH (US); Greyson Fischer, Massilion, OH (US)

( * ) Notice: Subject to any disclaimer, the term of this patent is extended or adjusted under 35 U.S.C. 154(b) by 0 days.

(21) Appl. No.: 13/228,152

(22) Filed: Sep. 8, 2011

(65) Prior Publication Data

US 2012/0330887 A1    Dec. 27, 2012

Related U.S. Application Data

(60) Provisional application No. 61/381,039, filed on Sep. 8, 2010.

(51) Int. Cl.
   *G06F 17/00* (2006.01)
   *G06F 17/30* (2006.01)

(52) U.S. Cl.
   CPC ............................ *G06F 17/30017* (2013.01)
   USPC ....................................................... 707/610

(58) Field of Classification Search
   USPC .......... 707/610–613, 617, 621, 623; 709/208, 709/217, 219, 229, 248; 713/400; 380/244
   See application file for complete search history.

(56) References Cited

U.S. PATENT DOCUMENTS

| 6,470,329 | B1 * | 10/2002 | Livschitz | ............................. 1/1 |
| 2002/0120838 | A1 * | 8/2002 | Abdulkader | .................. 713/153 |

OTHER PUBLICATIONS

Zi-ming Zhao, et al., An Efficient User-to-User Authentication Scheme in Peer-to-Peer System, Nov. 1-3, 2008, IEEE, 263-266.*

* cited by examiner

*Primary Examiner* — Jean B Fleurantin
(74) *Attorney, Agent, or Firm* — Brian Asquith

(57) ABSTRACT

Systems and methods are provided to facilitate distribution and synchronization of digital objects between a plurality of computing devices. In an embodiment, a master file catalog is maintained at a central server. As updates are made to digital object(s) on devices associated with the central server, file catalogs are forwarded to the master catalog which is updated accordingly. The master catalog can then be reviewed to facilitate file sharing in a peer-to-peer manner between the devices. In another embodiment, one-way hash pairings are created when a digital object is created/modified. Received hash pairings can be analyzed to facilitate determination of whether two extants of a digital object are the same or different. Utilizing one-way hash pairings enable sensitive information regarding a digital object to remain secure, and sensitive information (and digital objects) is only shared between authenticated devices.

20 Claims, 23 Drawing Sheets

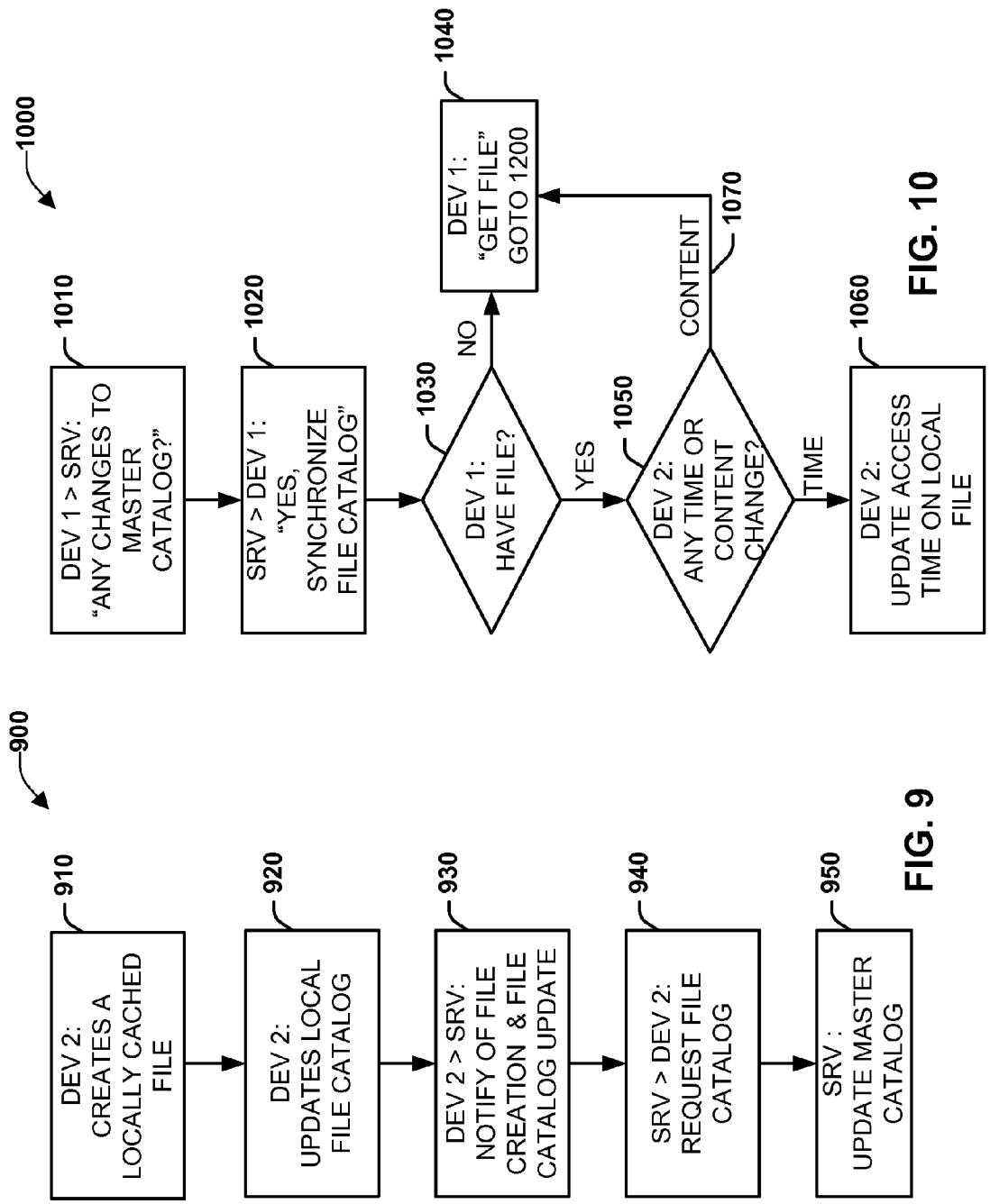

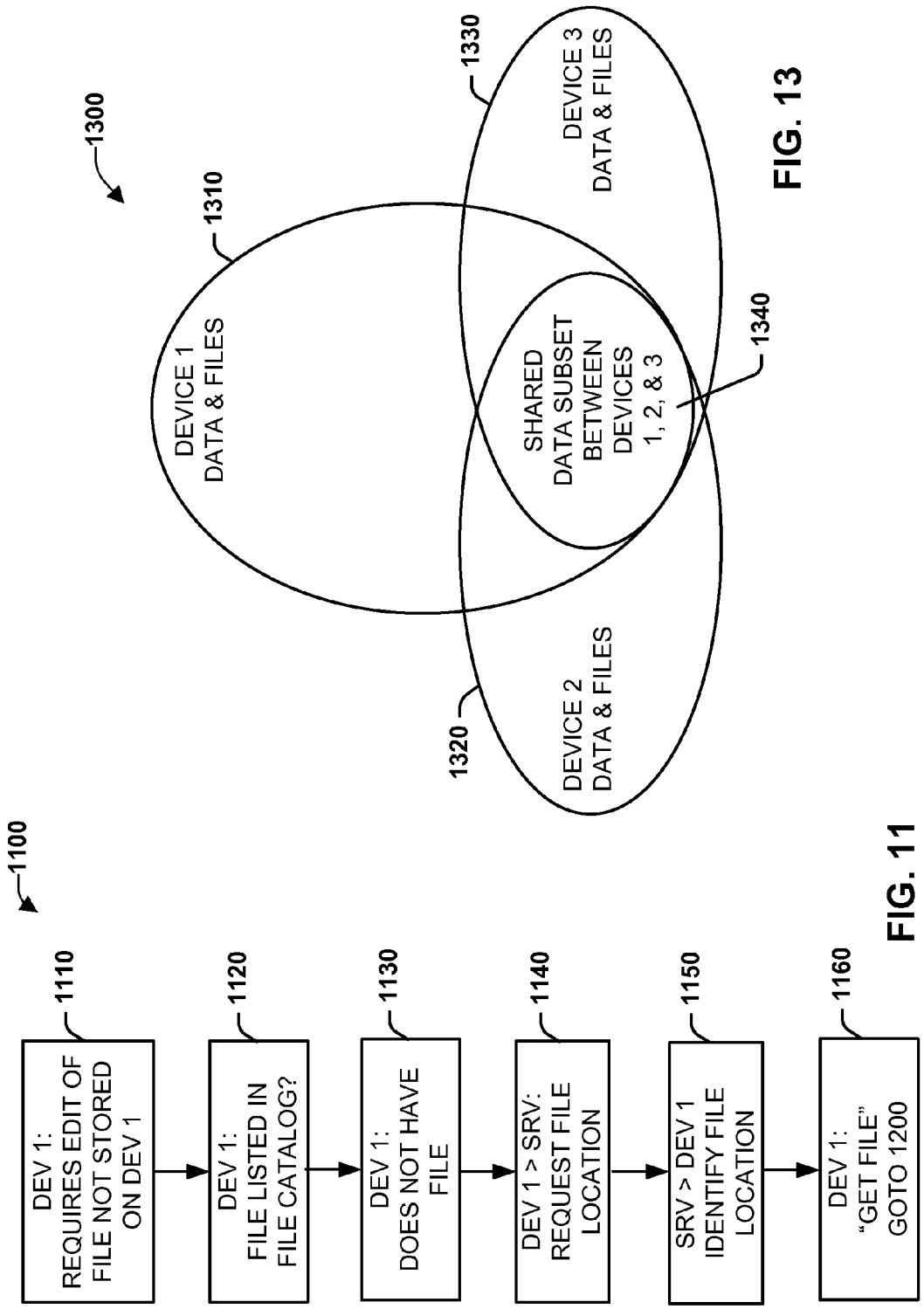

DISTRIBUTION AND SYNCHRONIZATION OF DIGITAL OBJECTS

CROSS REFERENCE

This application claims the benefit of U.S. Provisional Application Ser. No. 61/381,039, filed on Sep. 8, 2010, entitled "PEER-TO-PEER INTERACTIVE FILE SYSTEM". The entirety of the above-captioned application is incorporated herein by reference.

TECHNICAL FIELD

The subject specification relates generally to distributive computing systems and in particular distribution and synchronization of digital objects on those systems

BACKGROUND

The plethora of mobile computing devices have opened up user's requirements and abilities to access various digital objects, e.g., data, images, files, directories, etc., at any location with any of one or more devices available to them. In one example, a person may not know which digital object(s) they will need to access while operating in a mobile manner (e.g., travelling). Hence the person carries with them their "main" computer, e.g., their laptop, as it contains all of their digital objects, even though while they are on the road they prefer to use a different device, e.g., their tablet computer. Hence, the person will have to carry with them at least two devices, the laptop containing their digital objects, and their preferred device, a tablet computer. Carrying multiple devices can be inconvenient, when they would rather carry a single device. A recent technological development to facilitate transfer and access of digital objects from one or more remote locations is for the person to store their files on a third party computer(s), e.g., cloud computing. Third party computer(s) can be accessed from virtually any location via a network connection, thereby enabling the person to upload and download digital objects from other computers, e.g., third party computer(s) as desired, with whatever device they wish to use, wherever they are. Accordingly, the person can now travel with just their tablet computer, leave the laptop at home, while still being able to access any file(s) they may need which is/are stored on the third party computer, e.g., a cloud server.

However, a person may be reluctant to have their digital objects stored on a third party computer(s). For example, they may not want to incur the cost of employing a third party service(s). They may also consider their data to be confidential and are hesitant to have such confidential information stored on a third party computer(s) where the potential for access of the information by a third party exists. Further, the person may be hesitant to have their information stored on a third party computer(s), especially when considering such factors as "what happens to my digital objects if the service provider ceases to provide service?", or "can my data, or access thereof, be held to ransom? What is to stop the service provider from increasing their rates to access my digital objects?" Apart from using a third party computer(s) such as a cloud server, there are few options available for users to securely access files stored on one device from a remotely located device.

The above-described deficiencies of conventional distributed computing systems are merely intended to provide an overview of some of the problems of conventional systems and techniques, and are not intended to be exhaustive. Other problems with conventional systems and techniques, and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary, non-limiting embodiments in a simplified form as a prelude to the more detailed description of the various embodiments that follow Systems and methods are provided to facilitate synchronization and distribution of digital objects between a plurality of devices. In an exemplary, non-limiting embodiment a system is presented comprising a central device (e.g., a server) in communication with a plurality of devices. The plurality of devices can have stored thereon a plurality of digital objects (e.g., data, files, directories, etc.) which can be shared amongst the digital devices in a secure manner. Based on what digital objects are on a respective device, and modifications being made to the digital objects, a file catalog can be created detailing such digital object/modification information. The file catalogs can be forwarded to a master file catalog maintained at a central server. As updates are made to digital object(s) on devices associated with the central server, the file catalogs are forwarded to the master catalog which is updated accordingly. The master catalog can then be utilized to engender knowledge across the respective devices regarding which digital object(s) currently exist across the system.

As devices authenticate themselves on the system, file catalogs can be updated, and based thereon, digital object(s) can be transferred between the devices (e.g., in a peer-to-peer manner).

In another exemplary, non-limiting embodiment, one-way hash pairings are created when a digital object is created/modified, and the one-way hash pairings are combined in a transaction which is transmitted between a plurality of devices. By comparing received pairs of one-way hash pairings it is possible to determine whether a new digital object has been created, a digital object has been modified, or a digital object has been cancelled. One-way hashes can be created based upon the content of the digital object, as well as zero-value one-way hashes being utilized to indicate creation or deletion of a digital object. Transactions can be transmitted across a plurality of devices, but further information can only be obtained by a device authenticating with the device generating the transaction. Upon authentication, further information can be obtained regarding the digital object, e.g., filename, etc., and stored locally on the device requesting the further information. The digital object can be selected for download from a first device to a requesting device. As digital objects are created, modified, and deleted across the system, new transactions can be generated for each digital object instance.

A master directory can be compiled enabling a device to download recent or all transactions thereby enabling a device to obtain information regarding the digital objects available across a network.

In a further exemplary, non-limiting embodiment, devices can be grouped and assigned a Group ID enabling transaction(s), information, and digital objects to be limited to the devices only with the same Group ID. A device can be associated with more than one group and Group ID. As digital objects are created and modified, any conflicts can be identified and acted upon.

These and other embodiments are described in more detail below.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 9 is a flow diagram illustrating an exemplary, non-limiting embodiment for facilitating updating a catalog with a file created timestamp;

FIG. 10 is a flow diagram illustrating an exemplary, non-limiting embodiment for facilitating whether a locally stored file is to be updated;

FIG. 11 is a flow diagram illustrating an exemplary, non-limiting embodiment for facilitating editing a file that is not currently stored locally;

FIG. 13 is a depiction of an exemplary, non-limiting embodiment for predicting information of interest for presentation;

DESCRIPTION

Overview of Embodiments

As disclosed in accordance with the various aspects presented herein, various embodiments are presented providing a mechanism to connect various computing devices (e.g., servers, laptops, mobile phones, tablets, etc.) to one another to facilitate synchronization and transfer of digital objects directly therebetween, on a managed basis, and in a secure manner.

In an exemplary, non-limiting embodiment, a system is presented which operates by establishing peer-to-peer connections between client devices. Once connected, each device synchronizes their digital object(s) with other devices in the system without storing any content on third-party computer(s). A central server manages a catalog(s) of digital objects to be synchronized between devices. Depending upon the status of a digital object, e.g., opened, reviewed, modified, edited, newly created, etc., a device containing a required digital object can be located and the digital object transferred to the device requesting the digital object in a peer-to-peer fashion between the devices.

In a further, exemplary, non-limiting embodiment, synchronization and transfer of the digital objects is facilitated by means of one-way hashes being employed as part of a catalog(s) of the digital objects. Pairs of one-way hashes are generated upon creation/modification of a digital object, and the generated pairs of one-way hashes are compared with pre-existing one-way hash pairs to determine whether a digital object has been created/modified.

Catalog and Central Server Approach

Figure 1:
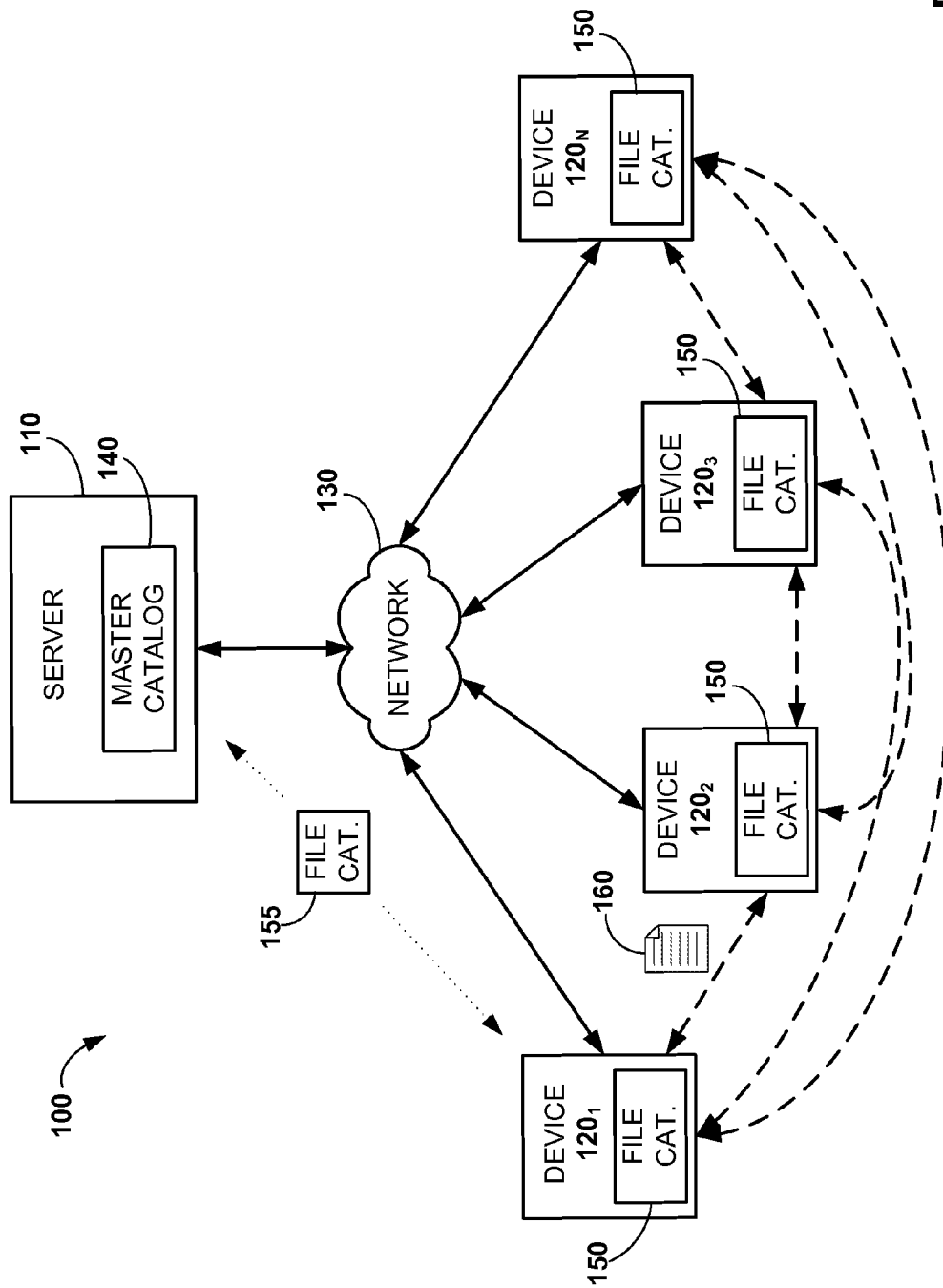
FIG. 1 is a block diagram illustrating an exemplary, non-limiting computing system configured to facilitate connection of various devices to one another to synchronize and exchange digital objects directly, on a managed peer-to-peer basis.

FIG. 1 illustrates system 100, to facilitate connection of various devices (e.g., laptops, mobile phones, tablets, etc.) to one another to synchronize digital objects directly, on a peer-to-peer basis. System 100 comprises a server 110 server in communication with a plurality of devices $120_{1-N}$, where communication is conducted via network 130. In one aspect server 110 can be a server that supports the functionality as conveyed in the various aspects presented herein. Server 110 performs a plurality of functions, as described below, including hosting a digital object catalog(s), changes to the catalog(s), device IDs, tokens for devices, and the like. Server 110 is in communication with devices $120_{1-N}$, via network 130. Devices $120_{1-N}$ and digital objects such as files, data, information, etc., stored thereon, are synchronized utilizing locally cached catalog(s) 150, stored on each device $120_{1-N}$, which are synchronized with a catalog 140 stored on server 110, aspects of which are described herein. In one aspect, network 130 can be the internet, intranet, or other suitable network comprising communication technology(s) facilitating operation of the various aspects presented herein, where such technologies can support data transfer employing ETHERNET, USB, WIFI, cellular, satellite, BLUETOOTH, or any other suitable wired and/or wireless network technology. As illustrated a plurality of devices $120_{1-N}$ can be in communication with the server 110, where N is an integer greater than 1. Types of devices $120_{1-N}$ can include a PC, laptop computer, IPHONE, IPAD, BLACKBERRY, tablet PC, ANDROID, SLATE PC, mobile phones, smartphones, NAS devices, vehicles (e.g. cars, bicycles, etc.), gaming devices, appliances or any other device equipped with a computational device capable of storing information and communicating over a network.

In an aspect, to facilitate synchronization of digital objects stored on each device $120_{1-N}$, each device includes a "shared" collection of digital objects and catalog(s) 150, which are available across system 100, wherein the file catalogs 150 are synchronized between the devices $120_{1-N}$, through the server 110. Server 110 contains a catalog 140 against which digital object catalog(s) 150 are compared to identify for example, whether an update has been made to an object. As well as being in communication with the server 110, via network 130, devices $120_{1-N}$ can also communicate with one another in a peer-to-peer fashion, thereby allowing devices to transfer digital objects directly from one device to another, e.g., object "x" is transferred from device $120_1$ to device $120_3$.

Owing to different available technologies, memory required to run operations for a particular device $120_{1-N}$, it is likely that each device $120_{1-N}$ will have a unique amount of memory available, accordingly one device (e.g., $120_2$) may be operating with different memory constraints than are affecting another device (e.g., $120_3$). Hence, one device may only be able to store a limited number of digital objects compared with the number stored on a second device. Accordingly, each device will have stored thereon an quantity of digital objects in accordance with the available memory (e.g., most accessed, most recently accessed, etc.), and a reference to objects not stored locally but are available on another device for transfer. Accordingly, each device will have an inventory of the digital objects available across system 100 synchronized via the server 110. As illustrated in FIG. 1, the various aspects described herein facilitate synchronization of a catalog (e.g., catalog 155 which represents a locally cached catalog 150) between a device (e.g., any of devices $120_{1-N}$) and a server 110 to facilitate sharing/updating of digital objects (e.g., file 160) between devices $120_{1-N}$. It is to be appreciated that no digital objects are transferred between a device and the server 110. Digital objects are shared between devices $120_{1-N}$ while catalog(s) 150 (or their representations 155) are transmitted across network 130 for comparison and updating in accordance with the catalog(s) on the server 110.

Figure 2:
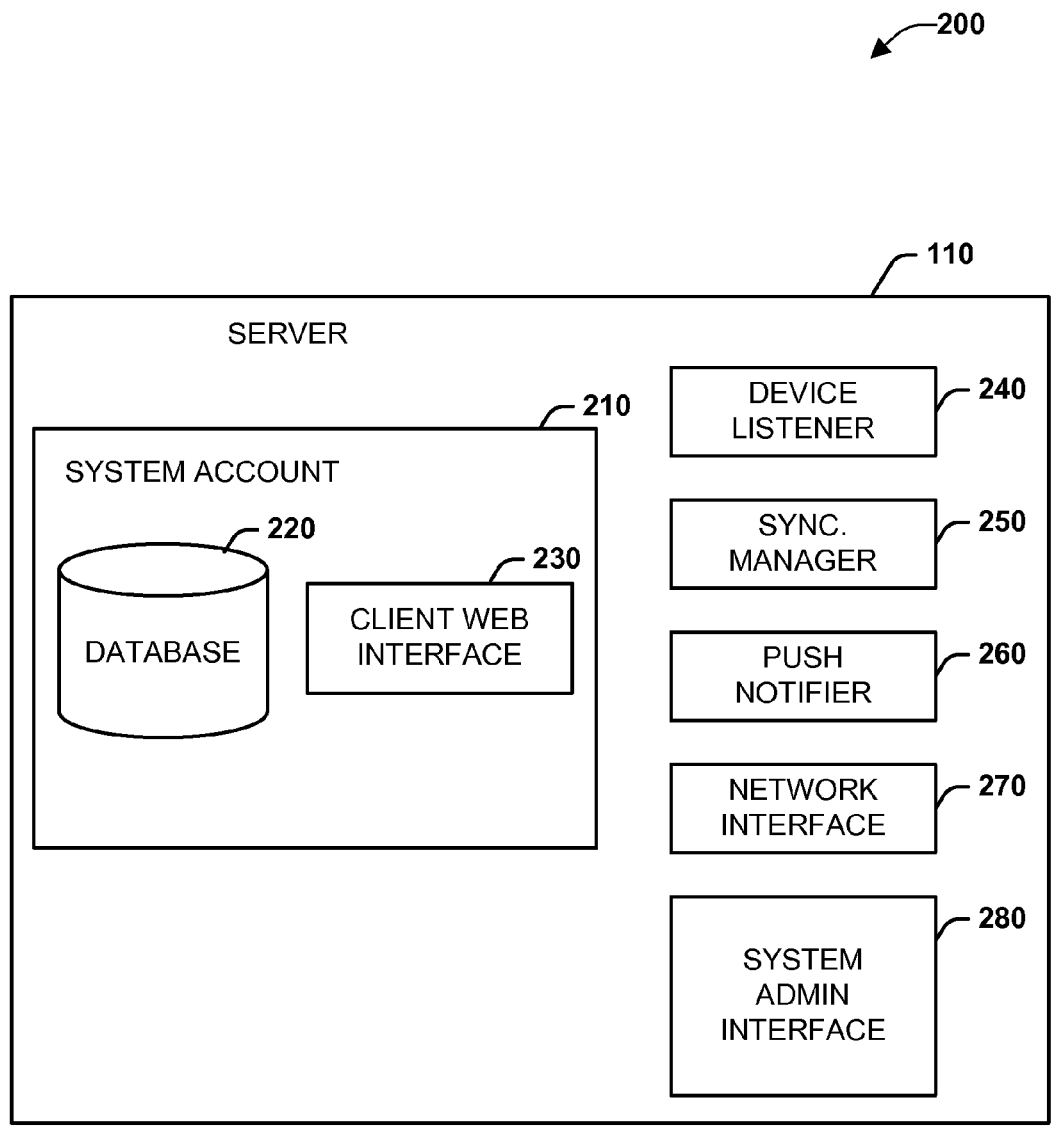
FIG. 2 is a block diagram illustrating an exemplary, non-limiting embodiment of various computer components facilitating synchronization of digital object(s)

Turning to FIG. 2, system 200 is presented, illustrating various components comprising server 110. In one aspect server 110 comprises one or more system accounts 210. A system account 210 is defined as a set of client devices (e.g., devices $120_{1-N}$) authorized to establish peer-to-peer connections between each other to facilitate synchronization and exchange of digital objects. Each client device (e.g., devices $120_{1-N}$) have stored thereon a catalog (e.g., file catalog 150) of all available digital objects stored across system 100, (e.g., devices $120_{1-N}$) and any other devices assigned/authorized to a system account 210. Various components can be assigned to a system account 210, to facilitate operation thereof, including database(s) 220 and client web interface 230 (i.e., a web portal) to facilitate management and interaction of a system account 210. In an aspect, during creation of a system account by a user, the user employs the client web interface 230 to add new devices to the system account. As devices are added, information pertaining to the added device can be stored in database 220, e.g., device ID, memory capacity, and the like.

In other aspects of the server 110, outside of the system account 210, are a number of components. A device listener 240 that can be employed to monitor any devices (e.g., devices $120_{1-N}$) that are assigned to a service account 210, such as monitoring the performance of a device, does the device have enough available memory, what is the bandwidth available to the device, and any other operations involved in ensuring that communications are maintained throughout the system and the necessary operations, in accordance with the various embodiments presented herein, can be performed. A synchronization manager 250 that manages the synchronization of a catalog (e.g., catalogs 150) between server 110 and the various devices $120_{1-N}$ assigned to a service account 210. For example, the synchronization manager 250 verifies that the data was correctly received. Push notifier 260 generates alerts, notifications, etc., pushed out to the various devices $120_{1-N}$ comprising the service account 210, whenever an action needs to be taken by a device $120_{1-N}$, or by a user of a particular device $120_{1-N}$. Network interface 270 facilitates access of a network (e.g., internet 130) enabling communication of the server 110 with the devices $120_{1-N}$ in communication with the server 110 via the network 130. System administration interface 280 can be employed to facilitate control of operations fundamental to the operation of server 110, and system 100, e.g., control server backend operations.

Figure 3:
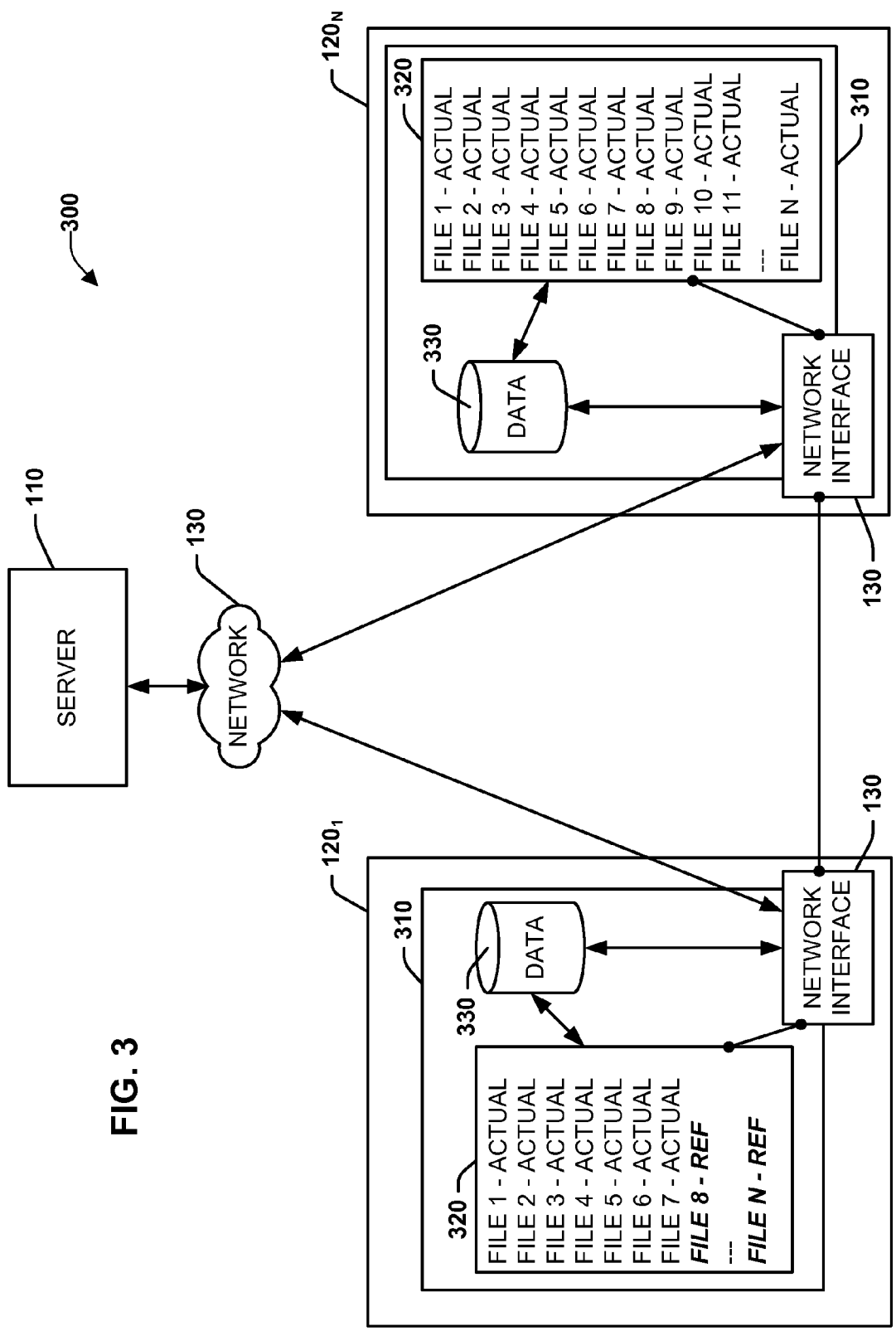
FIG. 3 is a block diagram illustrating an exemplary, non-limiting embodiment relating to operation of one or more client devices communicating with each other and a computer facilitating synchronization of digital object(s)

FIG. 3, illustrates system 300, presenting various aspects relating to operation of one or more client devices (e.g., devices $120_{1-N}$) communicating with each other and a server 110. In a further aspect, each client device $120_{1-N}$ includes a client application component 310 which supports synchronization of the master catalog 140 (as further discussed with reference to FIG. 4), a locally cached file catalog 320 stored on each client device $120_{1-N}$ and exchange of files directly between one or more devices (e.g., devices$120_{1-N}$), on a peer-to-peer basis. It is to be appreciated that the locally cached file catalog 320 and file catalog 150 perform the same function.

A client application component 310 allows devices (e.g., devices$120_{1-N}$) to access the peer-to-peer system (e.g., system 100), communicate with the server 110 and any other peer devices (e.g., devices$120_{1-N}$) which comprise a system account 210, and which are associated/authorized to interact with a particular device (e.g., devices$120_{1-N}$). The client application component 310 allows a user(s) of a device (e.g., devices$120_{1-N}$), where such a user may be human or autonomous, to determine what files, data, etc., stored on a particular device the user wants to synchronize with other devices. Data stored on each device (e.g., devices$120_{1-N}$) is typically stored within pre-determined directories. Data includes, but is not limited to files, documents, audio, video, media, databases, images, text, etc. In an aspect, the system (e.g., system 100) is agnostic as to what data is exchanged between a particular device and other peer devices.

As discussed previously, computers, tablets, NAS devices, etc., tend to have significant amounts of memory available for file and data storage. Other devices such as mobile phones, smart phones, gaming devices, vehicles, etc., have limited memory and are therefore considered "memory constrained". In one aspect, the client application component 310 utilizes available memory on a device (e.g., devices $120_{1-N}$) to store synchronized files locally on the device. It also allows a user of the device (e.g., devices$120_{1-N}$) to manually control the amount of memory used for storage of files and data.

In an aspect, the client application component 310 catalogs (e.g., in locally cached file catalog 320) and synchronizes all files and data within the aforementioned pre-determined directories. On memory constrained devices, the client application component 310 prioritizes files and data to synchronize and store locally on the device, referencing the remaining files and data from within a catalog of all files and data being synchronized by the System. It is to be appreciated that given the variation in available memory between the devices, the number of files stored on each device can vary, and accordingly, the locally cached file catalog 320 located on a given device will, in all probability, be different from that of another device. As shown in FIG. 3, the locally cached file catalog 320 for device $120_1$ contains a different list of available files compared with the locally cached file catalog 320 for device $120_N$. The file catalog 320 located on device $120_1$ indicates that device $120_1$ has actual files, files 1-7, stored thereon, and files 8-N are referenced, while the file catalog 320 for device $120_N$ indicates that device $120_N$ has actual files 1-N stored thereon. Database 330 can include any necessary encryption keys, policies, and the like to facilitate authorization and access of a device to system 100. In an aspect, when a user wishes to associate a device with a master catalog driven peer-to-peer system such as represented by FIG. 1, the device is added to a user's system account (e.g., to system account 210). As part of the association process an encryption key, or the like, is downloaded to device and the key is employed as part of an access authorization process when the device is attempting to access system 100, e.g., to perform a synchronization.

Figure 4:
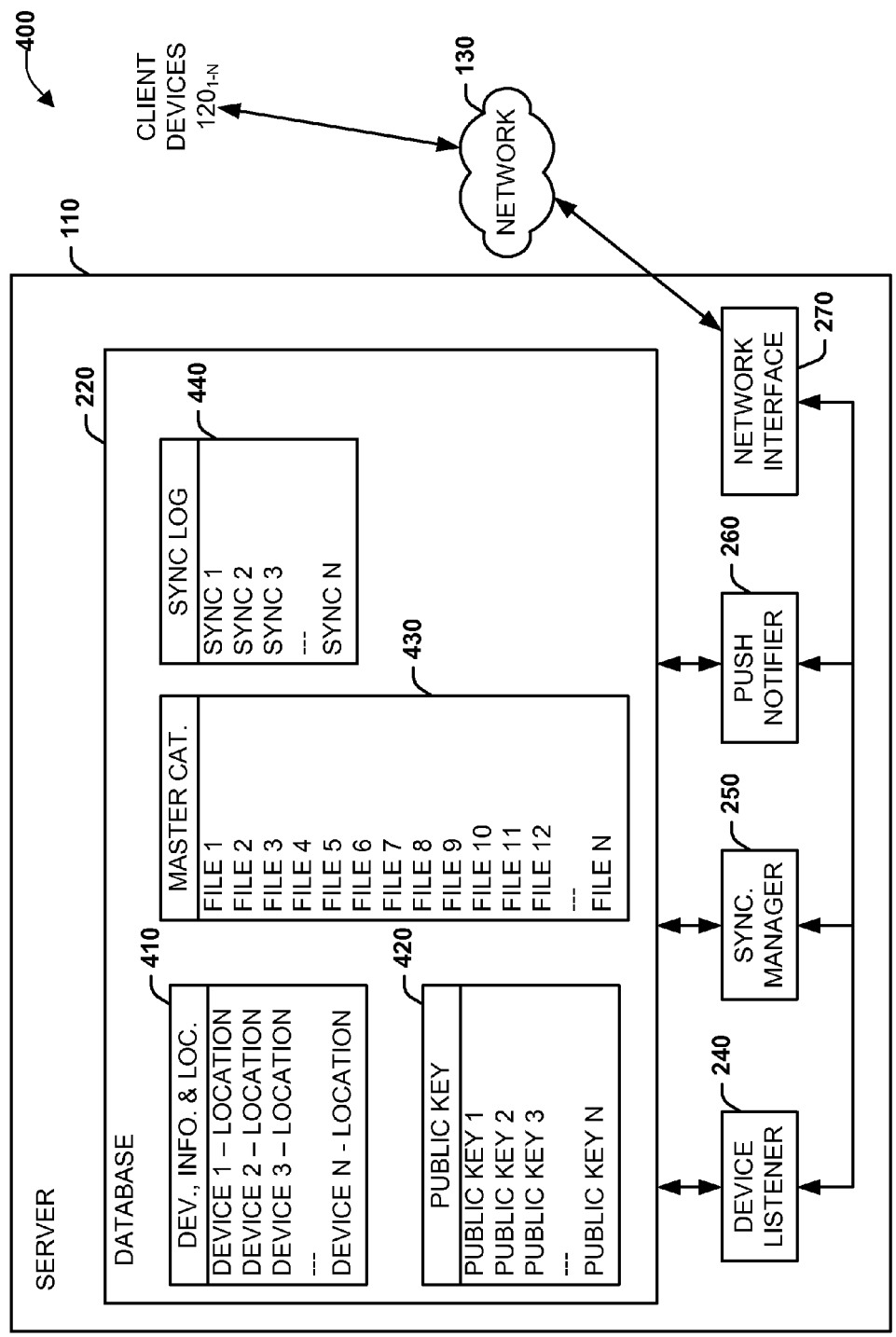
FIG. 4 is a block diagram illustrating an exemplary, non-limiting embodiment facilitating connection of various devices and digital object synchronization.

Turning to FIG. 4, system 400 presents components, directories, etc., and how they interact to facilitate connection of various devices (e.g., devices$120_{1-N}$) to one another to synchronize and exchange files directly, on a peer-to-peer basis.

Server 110 provides information to client devices (e.g., devices$120_{1-N}$) by means of communicating with the client application component 310 located on a device (e.g., any of devices$120_{1-N}$). This information, stored in database 220, includes a master catalog 430 of all the files and data being synchronized across system 100. In another aspect, a device info and location list 410 of authorized devices (e.g., devices$120_{1-N}$) to which a client device (e.g., any of devices$120_{1-N}$) may establish a peer-to-peer connection and current network locations (e.g., IP addresses, etc.), available bandwidth, etc., of the authorized devices, along with unauthorized devices. In a further aspect, a public key list 420 listing encryption keys for securing information transfers (both between devices$120_1$-N and server 110). In a further aspect, a synchronization log 440 detailing how a synchronization was performed, e.g., was the synchronization a success, was only a partial file received (e.g., the transmitting device went down before the file was fully received at the receiving device), and the like.

In an aspect, server 110 hosts a master catalog 430 of all files and data being synchronized by the system (e.g., system 100), and monitors individual devices for any changes to locally cached files which can affect the master catalog 430. Individual client devices (e.g., any of devices$120_{1-N}$) periodically check in with the server 110 providing updates to the master catalog 430 or to determine whether the master catalog 430 is different from the locally cached catalog 310 stored on the device. If a client device has viewed, edited or created a file locally, the locally cached catalog 310 will indicate file viewing(s), edit(s), creation(s), etc.

When a user (human or autonomous) creates or accesses a file or data stored locally on a device (e.g., any of devices$120_{1-N}$), either by creating a new document or file, reading an existing document or file, or editing an existing document or file, the client application component 310 appends the locally cached catalog on the device (e.g., any of devices$120_{1-N}$). The client application component 310 communicates any updates, viewings, creations, edits, etc., to server 110.

When the client application component 310 sends an updated file catalog to server 110, upon receipt, server 110 appends the master catalog 430 with the received change(s). Upon other client devices checking in to server 110, server 110 provides updated information to each device as to the status and currency of the files and data stored locally on any client device (e.g., any of devices$120_{1-N}$) comprising system 100. The client application component 310 on a device receiving the updated information from server 110, determines if any action is needed to update files and data stored locally on the client device. If so, the client application component 310 then takes the necessary steps to update said files and data accordingly.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figures 5, 6:
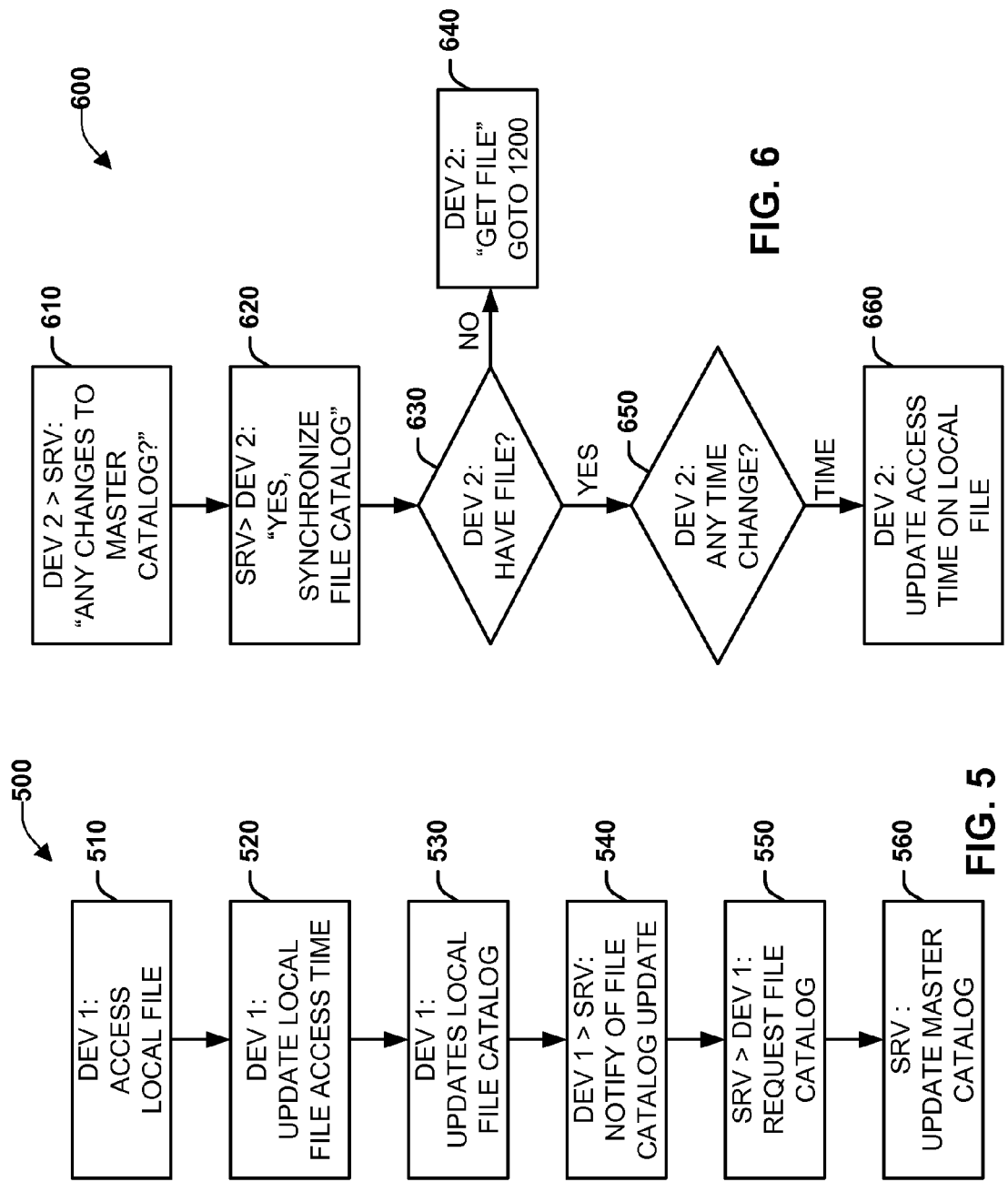
FIG. 5 is a flow diagram illustrating an exemplary, non-limiting embodiment for facilitating updating a catalog with a file access time.
FIG. 6 is a flow diagram illustrating an exemplary, non-limiting embodiment for facilitating whether a locally stored digital object requires updating.

FIG. 5 illustrates an example methodology 500 for facilitating updating a file catalog and/or a master catalog with a file access time. On a device (e.g., any of devices $120_{1-N}$) a client application component (e.g., client application component 310) manages files and data stored locally on the device by means of a file catalog (e.g., file catalog 150 or 320) locally cached on the device. At 510 a file stored on a device "DEV 1" is opened and reviewed. At 520, the local file is updated with a file/data access timestamp indicating when the file was opened/reviewed. In one aspect, owing to the file being most recently viewed it moves to the top of the list of files stored on the device, and accordingly, the file is to be moved to the top of file directories on the other devices. At 530, the client application component updates the local file catalog (e.g., file catalog 150 or 320) with the file/data access timestamp. At 540, the client application component notifies an associated server "SRV" (e.g., server 110) that the local file catalog has been updated. At 550, the server requests the file catalog from the client application component, and the file catalog is synchronized with the server. At 560, the server reviews the master catalog (e.g., master catalog 140, 430) stored thereon in comparison with the received file catalog, and if necessary the master catalog is updated accordingly.

FIG. 6 illustrates an example methodology 600 for facilitating whether a locally stored file needs to be updated. At 610, a device "DEV 2" (e.g., any of devices $120_{1-N}$) checks-in with a server "SRV" (e.g., server 110) and enquires as to whether there have been any changes (e.g., an updated access timestamp) made to a master catalog (e.g., master catalog 140, 430). The device wants to perform a synchronization with the master catalog. At 620, in an affirmative response to the enquiry, the server synchronizes a copy of the master catalog to the device. At 630, a client application component (e.g., client application component 310) located on the device reviews files, data, etc., locally stored on the device to determine whether the device has a copy of the file which is indicated to have been updated. At 640, based upon a negative response, e.g., "No I do not have the file", the device requires the file from another device and methodology 600 advances to methodology 1200. At 650, based upon an affirmative response, e.g., "Yes I have the file", the client application component reviews the file to identify whether an update is required. At 660 the local file is updated in accordance with the access time received in the master catalog. As other authorized devices check in with the server, their client application component note the changed catalog and update their local version with the new information.

Figure 7:
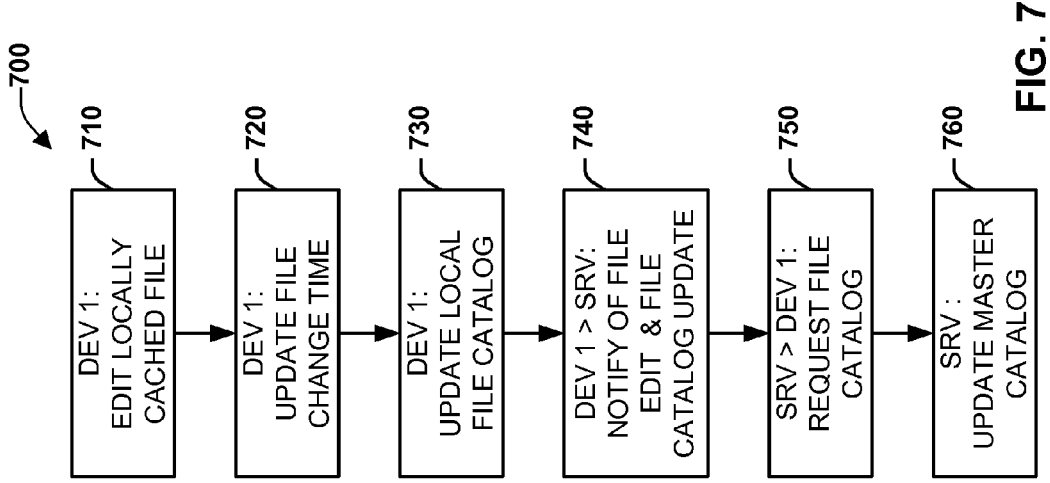
FIG. 7 is a flow diagram illustrating an exemplary, non-limiting embodiment for facilitating updating a catalog with a file edit.

FIG. 7 illustrates an example methodology 700 for facilitating updating a file catalog and/or a master catalog with a file edit. On a device (e.g., any of devices $120_{1-N}$) a client application component (e.g., client application component 310) manages files and data stored locally on the device by means of a file catalog (e.g., file catalog 150 or 320) locally cached on a device. At 710 a file stored on a device "DEV 1" is opened and edited. At 720, the local file is updated with a file/data edited timestamp indicating when the file was edited. At 730, the client application component updates the local file catalog (e.g., file catalog 150 or 320) with the file/data edited timestamp. At 740, the client application component notifies an associated server "SRV" (e.g., server 110) that the local file catalog has been updated in accordance with a file being edited. At 750, the server requests the file catalog from the client application component, and the file catalog is synchronized with the server. At 760, the server reviews the master catalog (e.g., master catalog 140, 430) stored thereon in comparison with the received file catalog, if necessary the master catalog is updated accordingly to indicate the timestamp of the file stored locally on the device being updated.

Figure 8:
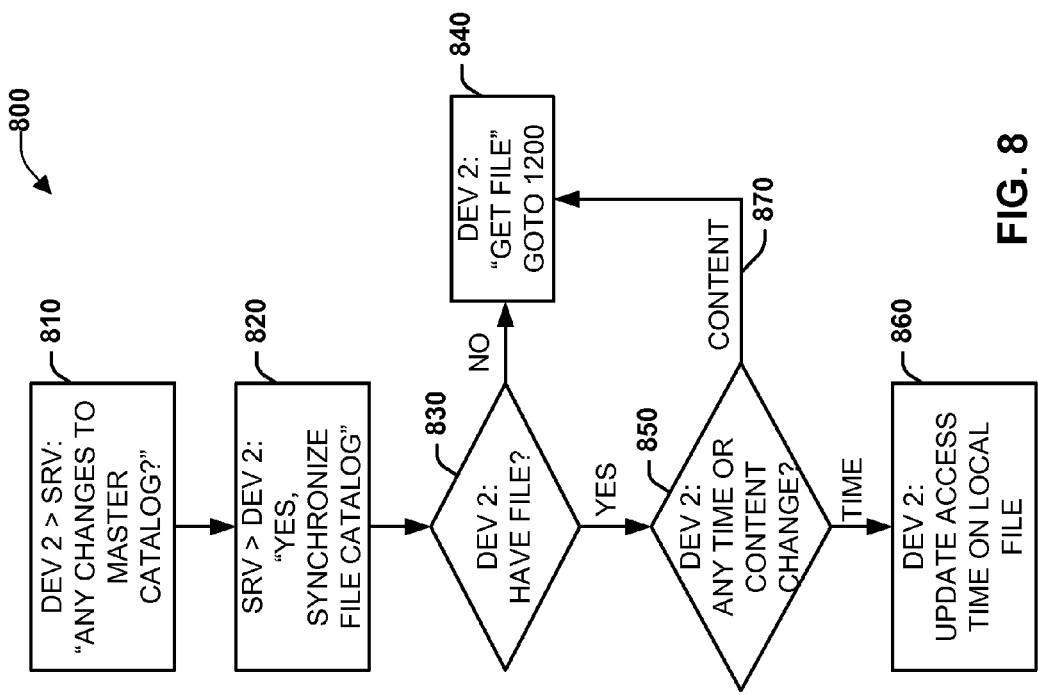
FIG. 8 is a flow diagram illustrating an exemplary, non-limiting embodiment for facilitating whether a locally stored file requires updating.

FIG. 8 illustrates an example methodology 800 for facilitating whether a locally stored file needs to be updated. At 810, a device "DEV 2" (e.g., any of devices $120_{1-N}$) checks-in (e.g., polls) with a server "SRV" (e.g., server 110) and enquires as to whether there have been any changes (e.g., an updated file edited timestamp) made to a master catalog (e.g., master catalog 140, 430). At 820, in an affirmative response to the enquiry, the server synchronizes a copy of the master catalog with the device. At 830, a client application component (e.g., client application component 310) located on the device reviews files, data, etc., locally stored on the device to determine whether the device has a copy of the file which is indicated to have been edited. At 840, based upon a negative response, e.g., "No I do not have the file", the device has to get the file from another device and methodology 800 advances to methodology 1200. At 850, based upon an affirmative response, e.g., "Yes, I have the file", the client application component reviews the file to identify whether an update is required. At 860 the local file is updated in accordance with the edit time received in the master catalog. At 870 the client application determines there has been a content change to the file, and the currently stored file does not have that content change. Returning to 840, the device has to obtain the file from another device and methodology 800 advances to methodology 1200. As other authorized devices check in with the server, their client application component(s) note the changed catalog and update their local version with the new information.

FIG. 9 illustrates an example methodology 900 for facilitating updating a file catalog and/or a master catalog with a file created timestamp. On a device (e.g., any of devices $120_{1-N}$) a client application component (e.g., client application component 310) manages files and data stored locally on the device by means of a file catalog (e.g., file catalog 150 or 320) locally cached on a device. At 910 a file is created and stored on a device "DEV 2" (e.g., any of devices $120_{1-N}$). At 920, the local file catalog (e.g., file catalog 150 or 320) is updated by the client application component with such information as a file/data created timestamp indicating when the file was created, along with other information such as, file name, type, size, data created, date modified, meta data, etc. At 930, the client application component notifies an associated server "SRV" (e.g., server 110) that the local file catalog has been updated. At 940, the server requests the updated file catalog from the client application component, and the file catalog is synchronized to the server. At 950, the server reviews the master catalog (e.g., master catalog 140, 430) stored thereon in comparison with the received file catalog, if necessary the master catalog is updated accordingly, e.g., to include the newly created file.

FIG. 10 illustrates an example methodology 1000 for facilitating whether a locally stored file needs to be updated in response to a file being created on another associated device. At 1010, a device "DEV 1" (e.g., any of devices $120_{1-N}$) checks-in with a server (e.g., server 110) and enquires as to whether there have been any changes (e.g., a new file created) made to a master catalog (e.g., master catalog 140, 430). At 1020, in an affirmative response to the enquiry, the server synchronizes a copy of the master catalog with the device. At 1030, a client application component (e.g., client application component 310) located on the device reviews files, data, etc., locally stored on the device to determine whether the device has a copy of the newly created file. At 1040, based upon a negative response, e.g., "No I do not have the file", the device has to get the file from the device where the file was newly created (or another device which has a copy of the newly created file) and methodology 1000 advances to methodology 1200. At 1050, based upon an affirmative response, e.g., "Yes, I have the file", the client application component reviews the file to identify whether an update is required. At 1060 the local file is updated in accordance with the creation time received in the master catalog. At 1070 the client application determines there has been a content change to the file, and the currently stored file does not have that content change. Returning to 1040, the device has to obtain the file from another device and methodology 800 advances to methodology 1200.

FIG. 11 illustrates an example methodology 1100 for facilitating editing a file that is currently not stored on a device. On a device (e.g., any of devices $120_{1-N}$) a client application component (e.g., client application component 310) manages files and data stored locally on the device by means of a file catalog (e.g., file catalog 150 or 320) locally cached on a device. At 1110 a device "DEV 1" requires a file to edit. At 1120, the client application component reviews the local file catalog to determine whether it has the file requiring edit. At 1130, upon reviewing the local file catalog, the client application component determines that the device does not have the required file. For example, a memory constrained device requires a file for editing, but owing to the memory contraints, the file is not located on the device. At 1140, the device requests the server "SRV" (e.g., server 110) to identify where the required file is located. At 1150 the server reviews the master catalog and identifies where the file is located. At 1160 the device retrieves the file from another device in a peer-to-peer operation. Methodology 1100 advances to methodology 1200.

Figure 12:
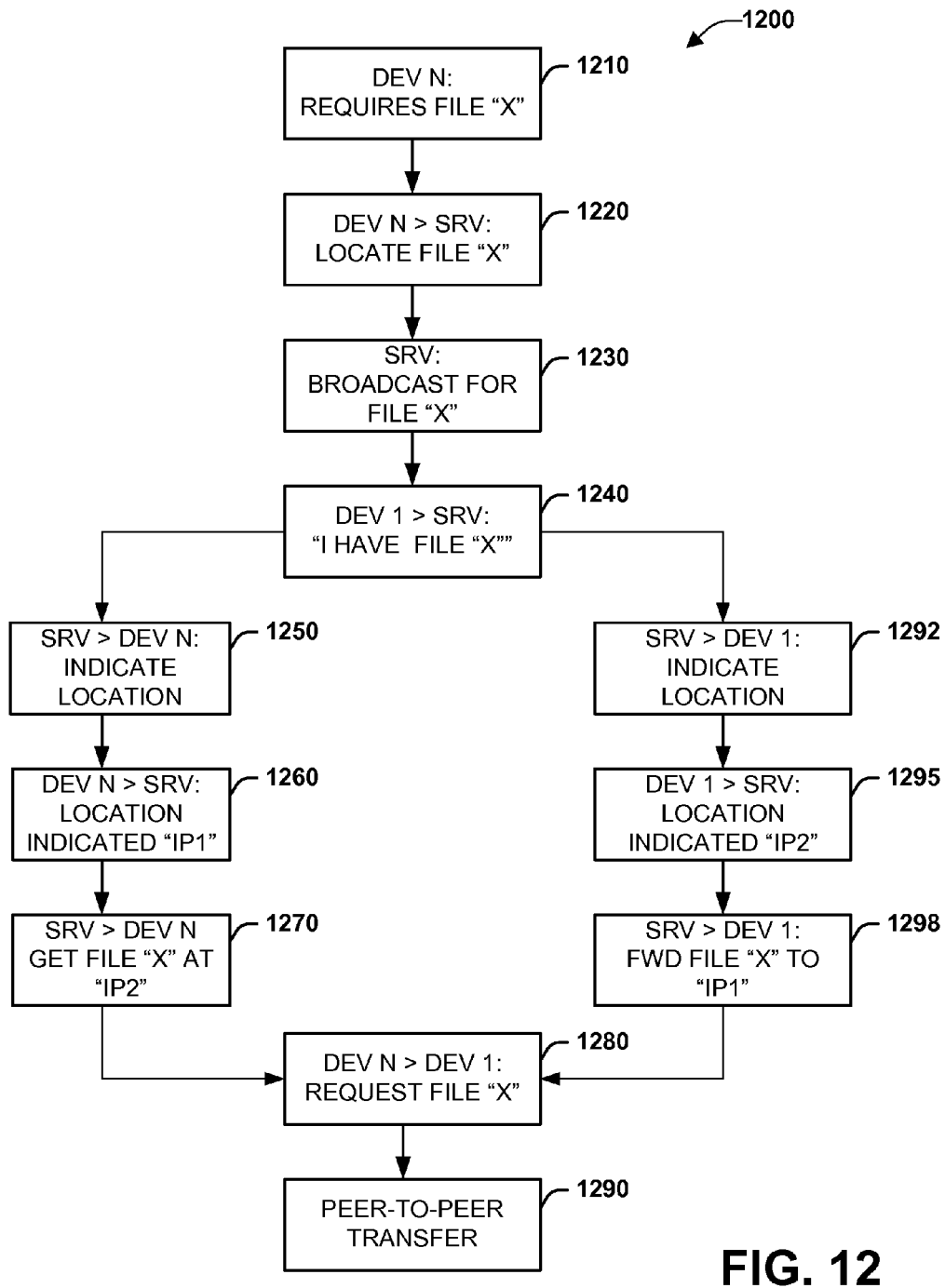
FIG. 12 is a flow diagram illustrating an exemplary, non-limiting embodiment for facilitating retrieval of a file by a device.

FIG. 12 illustrates an example methodology 1200 for facilitating retrieval of a file by one device from an associated device in a peer-to-peer fashion. When a file catalog synchronization and/or file transfer request is made, a client application component located on a subject device is responsible for negotiating the peer-to-peer communications between devices. At 1210, a device "DEV N" (e.g., any of devices $120_{1-N}$) requires a particular file "x". At 1220, the client application component (e.g., client application component 310) on the device requests the associated server "SRV" locate the required file, where the required file is stored on any device(s) associated with the server/requesting device (e.g., are part of the same system account 210). At 1230, the server broadcasts, to the associated devices, a request for any device having the required file to identify itself. At 1240, a device "DEV 1" having the required file indicates that it has the file. At 1250, the server requests the device requesting the file to identify its location. At 1260, the device requesting the file indicates its location, e.g., by forwarding "IP1" address to the server. At 1270, the server informs the requesting device that the file can be retrieved from a device located at IP2. At 1280, the device "DEV N" requiring the file requests the file from the device "DEV 1" having the file. At 1290, peer-to-peer communications are established between the device requesting the file and the device having the file, and the file is obtained by the device requesting the file. Acts 1250-1270 are an example of where the requesting device retrieves the required file from another device, a "pull" approach. Alternatively, a "push" approach can be employed as shown in acts 1292 to 1298. At 1292, in response to act 1240 where a device indicates that it has a requested file, the server can request the device "DEV 1" having the requested file indicate it's location. At 1295, the device having the requested file indicates it's location as "IP2". At 1298, the server indicates to the device "DEV 1" having the requested file to prepare to forward the file to the location of a device which is requesting the device. At 1280 and 1290 the devices communicate in a peer-to-peer fashion enabling transfer of the requested file.

It is to be appreciated that in an alternative aspect to methodology 1200, rather than the server broadcasting a request to the devices to indicate which device has file "x" the server can review the master catalog, stored thereon, to identify which device(s) have a copy of the file, which have the most recent copy of the file, and the like. In another embodiment, if a device requests a file/data, the device asks the server which device(s) have the requested file. The server references the master catalog to determine which device(s) have the requested file. The server verifies the currency of the data and triggers a synchronization and/or transfer. The server provides to the device requesting the file the location(s) of the other devices that have the file. The client applications on the authorized devices then communicate directly to establish a peer-to-peer connection to facilitate transfer of the requested file.

FIG. 13 illustrates how files can be shared between various devices. As described earlier, a system account combines a plurality of devices whereby file and data are shared between them. Client devices can be added to or deleted from the system account either through a client application, a web-based system, through an administrative portal or other means. Within a user's account, a user may attach their various devices to their account, including those shared by other organizations, entities, etc. As shown in FIG. 13, individual files, subsets of files, directories, etc., can be shared amongst all devices or restricted to only particular devices or user accounts. For example, 1310, 1320, and 1330 pertain to files that are restricted to a particular device. Files 1340 is a group of files that can be shared/accessed by all the Settings related to the sharing of subsets of data and files are retained by all devices within a user's account.

For devices that are memory constrained, the catalog provides not only a list of all files and data within the System, but those files and data that reside on the local device. Those files and data that do not reside on the local devices are listed by reference in the local catalog.

It is to be appreciated that from time to time, devices comprising system 100 (e.g., devices comprising a system account 210) go off line. When a local device queries the server with a file transfer/synchronization request, the server may broadcast, contact directly or in someway communicate to all authorized devices that a file synchronization is necessary. Devices that are connected to system 100 will establish peer-to-peer connections in order to accomplish the synchronization(s). Devices that are off line during this time will be noted in the master catalog 140. When devices come on line and check in with the server, additional synchronizations will be performed by the client application (e.g., client application component 310) on the device(s).

In an aspect, Peer-to-Peer connections among client devices are non-linear. Each device can communicate to one or many.

In another aspect, each client device communicates with the other devices, independently of the server. During file/data transfers and synchronizations, client applications auto-negotiate their connections with the other clients. The devices look for the best connection to the source and/or destination of data. The client applications also seek out the devices that are the "most available" (i.e. available processor cycles, etc.)

In a further aspect, a means of resolving conflicts among devices with respect to data transfers and synchronizations is provided. Using algorithms to compare incoming data against the local file catalog and/or the master catalog on the server, client applications determine which file is the most recent. When conflicts arise between a locally cached file and one amongst the peer devices, the client application on the local device determines if the locally stored file is superior to the file amongst the peer devices. If the local file is the correct file, the local catalog is updated and sent to the server for dissemination to the other authorized devices. If the local client application determines that the local version of the file is subordinate to the one amongst the peer devices, the local file is replaced with the superior file retrieved from the group of peer devices.

In another aspect, end users provision service under a single user account. Client devices can be added or deleted to the system either through a client application, a web-based system, through an administrative portal or other means. Within a user's account, a user may attach their various devices to their account, including those shared by other organizations, entities, etc. Individual files, subsets of files, directories, etc. can be shared amongst all devices or restricted to only particular devices or user accounts. Settings related to the sharing of subsets of data and files are retained by all devices within a user's account.

In another aspect, prior to a file being transferred from one device to another, the file size of the file can be compared with the available memory of the receiving device and an appropriate notification generated. For example, prior to transferring a file that will occupy a significant amount of the receiving device's memory, an alarm can be raised notifying the user that the file is large, will take up X % of available memory, do they want to proceed?

In another aspect, whenever a change is made to a file on a device, a corresponding updated file catalog is generated by the client application running on the device and the updated file catalog is synchronized with the server. The server reviews the received updated file catalog in comparison with the master catalog stored on the server. If any changes are detected between the received file catalog and the master catalog, a work flow can be triggered whereby all the other devices connected to the system are to synchronize their file catalogs with the server master catalog and, accordingly, request/receive the changed file(s) from the device(s) having the most current version of the changed file(s).

In a further aspect, the system 100 can be running in the background and has API hooks, or the like, that other software developers can employ the system as the file depository to be employed with an application. For example, a device has the MICROSOFT WORD Mobile application running thereon, files can be transferred in accordance with various aspects presented herein and then access with the MICROSOFT WORD Mobile application. Accordingly, in one aspect system 100 presented herein can operate as a standalone system facilitating file updating across a plurality of devices. In another aspect, system 100 can operate and support the file directory/structure of a application running on a device on which system 100 is running in the background.

In another aspect, to facilitate comparison between a file catalog and a master catalog a plurality of timestamps are employed, where the timestamps indicate a time and an activity performed. For example, when a file is viewed a "viewed timestamp" is created, when a file is edited an "edited timestamp" is created, when a file is created a "file created timestamp" is also created. Comparison of the file timestamps across system 100 enables file synchronization to be performed and, accordingly, file request/update.

In another aspect, whenever a file is viewed, edited, created, it is placed at the top of a file directory on the device. Correspondingly, the most recently active file is to be brought to the top of the file directory on all the other devices. When a device polls the server, or the server initiates synchronization, the client application running on each devices performs the necessary actions to facilitate the file being placed on the top of the file directory for each of the devices. Such actions can include updating a timestamp, retrieving the file from another device, etc.

In a further aspect, as files are brought to the top of a file directory, other files are moved down the file directory. On a device having limited memory, a situation can be reached where a file at the bottom of the directory has to be deleted to facilitate a new file being brought to the top of the file directory. Accordingly, the file can be deleted, and a reference to the file is stored in the file directory, e.g., File 8—REF of directory 320. In another aspect, rather than file placement in a directory being based upon "most recently accessed", one or more files can be flagged as "favorite", or similar ranking system, whereby the "favorite" file is never deleted from a device, or, if the favorite is to be deleted, the user is prompted to authorize the deletion.

In a further aspect, where there is the ability to download the file from two or more devices, the device chosen to download from can be based upon the available bandwidth for download, e.g., the file is retrieved from the device having the faster download. Effectively, the client applications will autonegotiate the path of least resistance to obtain the data from another device.

Further, once the various components comprising system 100 have indicated their presence, e.g., a new device has been added to a system account, and the devices are in communication it is not necessary for communications to be conducted in conjunction with a server. In an aspect, once the devices are in peer-to-peer communication file catalogs can be synchronized therebetween. Such operation facilitates file transfer in the event that a server goes offline. In another aspect, such operation can facilitate synchronization of files between devices without a server having to be present.

Catalog Using One-Way Hash(es)

As previously described, a plurality of issues pertain to the distribution and synchronization of digital objects (e.g., data, images, files, directories, etc.) across a number of devices where the devices are connected by any communication means such as LAN, wireless network, etc. In a further embodiment, a catalog can be created and maintained whereby the operations of creation, modification, deletion, etc., of a digital object can be tracked using a series of cryptographic hash functions, such as a one-way hash's (also termed herein as a one-way #, and also as a #). The one-way hash can be of any suitable means such as a secure hash algorithm (e.g., SHA-0, SHA-1, SHA-2, SHA-224, SHA-256, SHA-384, SHA-512, SHA-3, etc.), a message-digest algorithm (e.g., MD4, MD5, etc.), a hash employing a Merkle-Damgard construction, a hash employing a Luby-Rackoff construction, RIPEMD-128, RIPEMD-160, etc. While only a limited number of types of hash are presented it is to be appreciated that any suitable hash can be utilized with the various embodiments presented herein, and is not limited to the examples presented herein.

Figure 14:
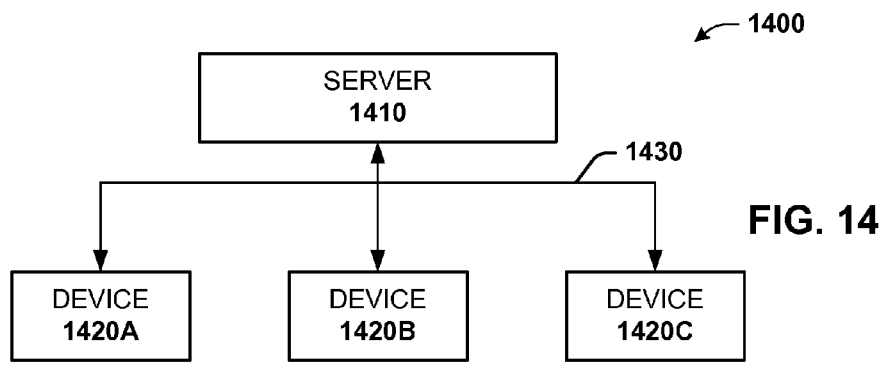
FIG. 14 is a block diagram illustrating an exemplary, non-limiting computing system configured to facilitate connection of various devices to one another to synchronize and exchange digital objects.
Figure 15:
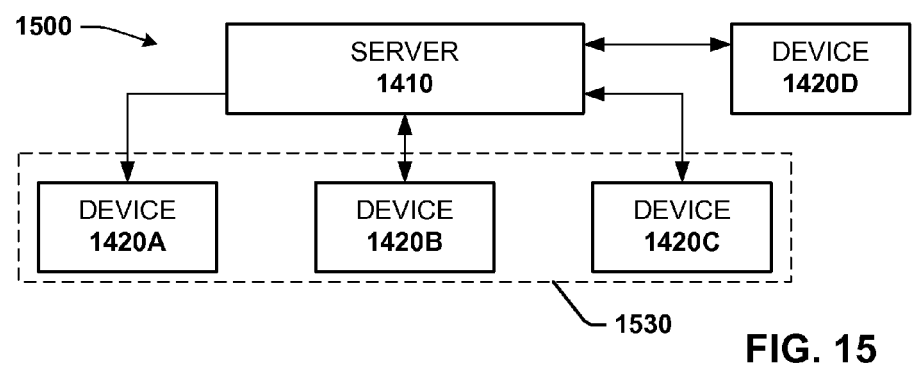
FIG. 15 is a block diagram illustrating an exemplary, non-limiting computing system configured to facilitate connection of various devices to one another to synchronize and exchange digital objects.
Figure 16:
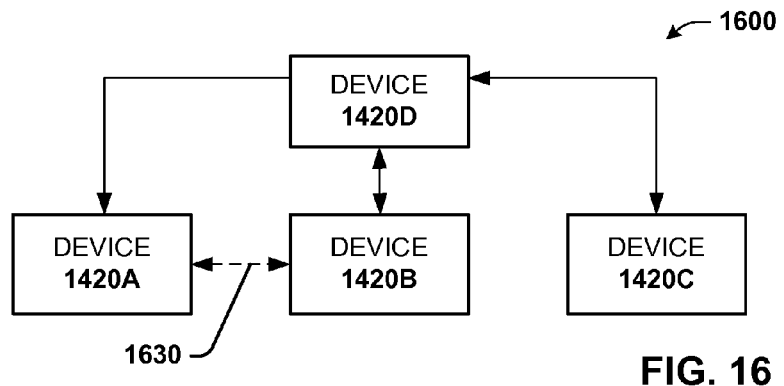
FIG. 16 is a block diagram illustrating an exemplary, non-limiting computing system configured to facilitate connection of various devices to one another to synchronize and exchange digital objects.

Effectively, the various embodiments presented herein regarding utilization of a one-way hash(es) generally comprise of the following operations:

a) grouping of devices, b) forming a digital object directory for each device in the device group, c) upon creation of a digital object on an originating device, generating a pair of #'s, the first # being a zero # and the second # being based upon the digital object, d) forwarding the pair of #'s to the various devices in the group, e) determining whether the forwarded pair of #'s received at a respective device are a new pair of #'s or have been previously received, f) if the pair of #'s have been previously received, then ignore the receipt, g) if the pair of #'s have not been previously received then authenticate the receiving device with the originating device, h) upon successful authentication, data pertaining to the digital object is forwarded from the originating device to the receiving device, and the directory is updated with the data (e.g., the identifier of the digital object), i) a request can be generated for the digital object to be forwarded from the originating device to the receiving device, j) the digital object is forwarded to the receiving device (with any further authentication as necessary, being performed), A plurality of system configurations, FIGS. 14-16 are presented to convey the various system configurations that can be utilized with the one-way hash operations presented herein. It is to be appreciated that any number of the various system configurations and comprising devices can exist and the configurations presented in FIGS. 14-16 are merely examples. FIG. 14 illustrates an exemplary, non-limiting embodiment of a server 1410 communicatively coupled to a plurality of devices 1420A-C. System 1400 can be a LAN, intranet, internet, or similar network, whereby devices 1420A-C can communicate with each other directly, as well with server 1410, via communications network 1430.

FIG. 15 illustrates an exemplary, non-limiting embodiment of a server 1410 communicatively coupled to a plurality of devices 1420A-D. System 1500 comprises devices 1420A-C being part of a group 1530 of devices, with device 1420D being communicatively coupled to server 1410 but not part of group 1530. Owing to device 1420D being connected to server 1410 it is possible for device 1420D to forward and receive data, information, etc., from any of devices 1420A-1420C and server 1410, but any information received by device 1420D that does not pertain to device 1420D (e.g., the information only relates to devices in group 1530) can be ignored by device 1420D. The concept of grouping with regard to the various embodiments pertaining to one-way hash(es) will be explained further herein. It is to be appreciated that the concept of grouping with regard to utilizing one-way hash(es) is similar in nature to the system account previously discussed in terms of a number of devices associated with a group/system account synchronizing and distributing files and digital objects.

FIG. 16 illustrates an exemplary, non-limiting embodiment of a plurality of devices 1420A-D communicatively coupled, where communications can be by a LAN or similar, as well as in a peer-to-peer approach 1630.

Figure 17:
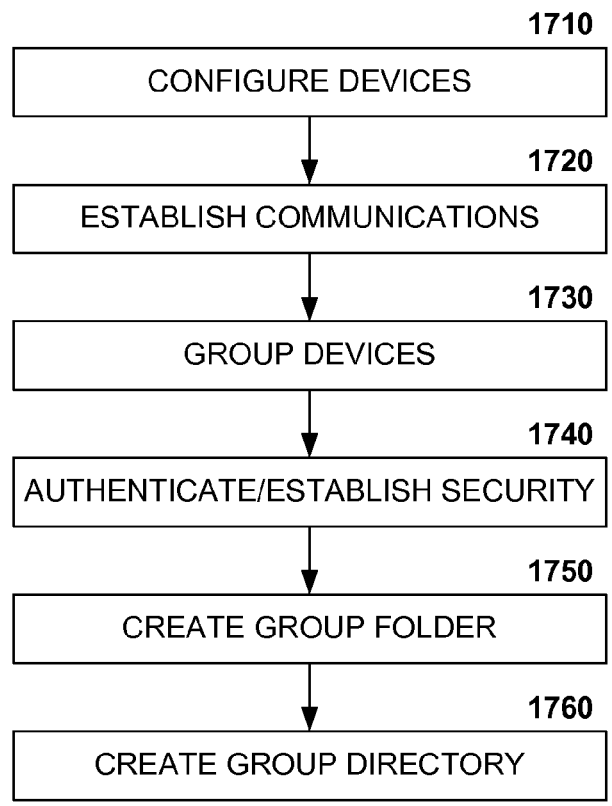
FIG. 17 is a flow diagram illustrating an exemplary, non-limiting embodiment for facilitating distribution and synchronization of a digital object.

FIGS. 17-20, and 23-30 present a number of flow diagrams representing various operations which can be performed during synchronization and distribution of digital objects in accord with various exemplary, non-limiting embodiments presented herein. FIG. 17 illustrates a flow diagram illustrating an exemplary, non-limiting embodiment for synchronization and distribution of digital objects across a plurality of computing devices. The embodiment of FIG. 17 can be utilized by any components comprising FIGS. 14-16, and further, any components comprising FIGS. 21 and 23, which are described hereinafter.

At 1710 a plurality of computing devices (e.g., server 1410, devices 1420A-D) are obtained and configured to facilitate communication and transmission of data therebetween.

At 1720 communications (e.g., via any of communication components 14705 and 1470A-C) are established between the plurality of computing devices (e.g., server 1410, devices 1420A-D).

At 1730 the plurality of devices (or a subset of the plurality of devices) are identified as forming the same group and are given a Group ID (e.g., a Group ID associated with any of Group directories 1450A-C&S). The Group ID is utilized to indicate whether a digital object (e.g., digital objects 1425, $1425_1$, 1425S, etc.) pertains to a particular group of devices.

At 1740 the plurality of devices associated with each other by a Group ID can undergo authentication procedures (e.g., by authentication components 1490A-C&S) to facilitate establishment of security between the plurality devices. Any suitable means for authentication can be utilized, as is known in the art.

At 1750 at each device a group folder (e.g., any of group folders 1450A-C&S) is created for each particular Group ID that the device has been associated with. It is to be appreciated that a device may be associated with a number of different Group ID's and groups of devices.

At 1760 a directory (e.g., any of directory 1455A-C&S) is created for the respective group folder, wherein the directory will contain the various digital objects (e.g., digital objects 1425, $1425_1$, 1425S, etc.) identified as being associated with the Group ID.

Figure 18:
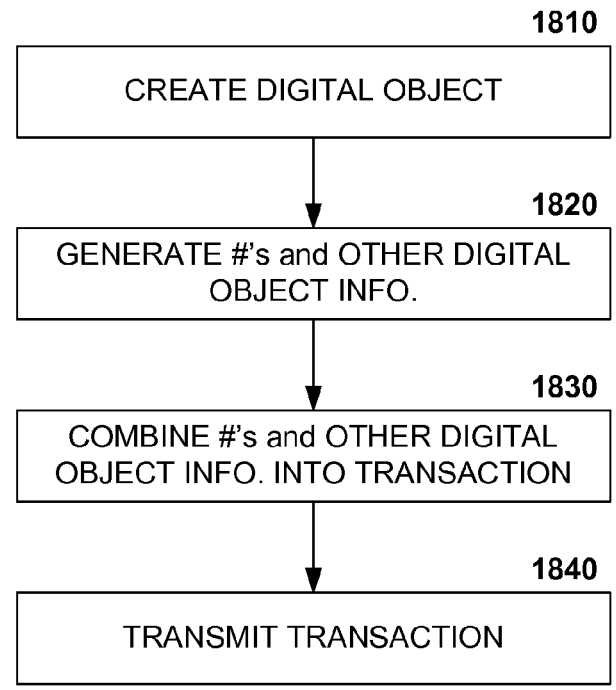
FIG. 18 is a flow diagram illustrating an exemplary, non-limiting embodiment for facilitating distribution and synchronization of a digital object.

FIG. 18 illustrates a flow diagram illustrating an exemplary, non-limiting embodiment for synchronization and distribution of digital objects across a plurality of computing devices. The embodiment presented in FIG. 18 can be utilized by any components comprising FIGS. 14-16, and further, any components comprising FIGS. 21 and 23, which are described hereinafter.

At 1810 a digital object (e.g., digital object 1425) is created on a device (e.g., device 1420A) comprising a particular Group ID (e.g., a Group ID associated with any of Group directories 1450A-C&S). For example, a word processing document is created, a JPEG image is uploaded to a device, software code is written and stored, and the like.

At 1820 a pair of one-way hash's are generated for the digital object as well as other information pertaining to the digital object to facilitate identification of the digital object and the device where it was created. Owing to the digital object being a new file, etc., there is no one-way hash previously associated with the digital object, and a zero hash ($\#_0$) (e.g., 2358) is generated for the digital object indicating the digital object is new and has no predecessors (e.g., the digital object is unique and not a modification of a previously existing digital object). A second hash ($\#_1$) (e.g., 2360) is created and can be generated from the digital information comprising the digital object. In one embodiment, the second hash can be created from the data comprising the digital object, such as the pixels in the JPEG image, the text of the word processing document, etc. In other embodiments, the hash can be derived from any data/information comprising or pertaining to the newly created digital object. It is to be noted that the second hash is identified as $\#_1$, where the identifier 1 is merely being used herein to indicate a sequence from the identifier 0, and any hash number can be used, e.g., as determined from the data the hash is generated from. The one-way hash is accompanied by other information pertaining to the digital object to facilitate identification of the digital object and the device where it was created. The information can include a time stamp identifying when the digital object was created (e.g., saved to a local memory), the digital object, a signature (e.g., a digital authentication certificate) pertaining to the device generating the hash thereby enabling subsequent authentication processes to be performed by device(s) requesting further information about the digital object and/or the digital object itself, a Group ID indicating which group of devices the digital object is to be allowed access. It is to be appreciated that a device address can be inferred from any protocol over which a device creating (and later modifying) is communicating with other devices (for example, transmission control protocol (TCP), user datagram protocol (UDP), and the like). A receiving device (e.g., a server) knows which device is reporting a transaction owing to the transaction being received in the same session that the device started with establishing communications (e.g., logging into a server). Alternatively, a device address cn be any other unique identifier associated with the particular device (e.g., MAC address, network address, device ID, SIM number, etc.).

At 1830 $\#_0$ and $\#_1$ are combined to form a transaction, with the transaction being combined with the other pertinent information (e.g., any of time stamp, device address, signature, Group ID, etc.).

At 1840 the transaction and pertinent information is transmitted from the device (e.g., device 1420A) originating the digital object (e.g., digital object 1425) to any devices (e.g., any of devices 1420B, 1420C and server 1410) which are communicatively coupled to the originating device. As mentioned herein (e.g., FIGS. 14-16) the originating device can be communicatively coupled to other devices via a network (LAN, intranet, internet, cellular network, etc.) and the transaction is pushed out to each of the devices communicatively coupled to the originating device.

Figure 19:
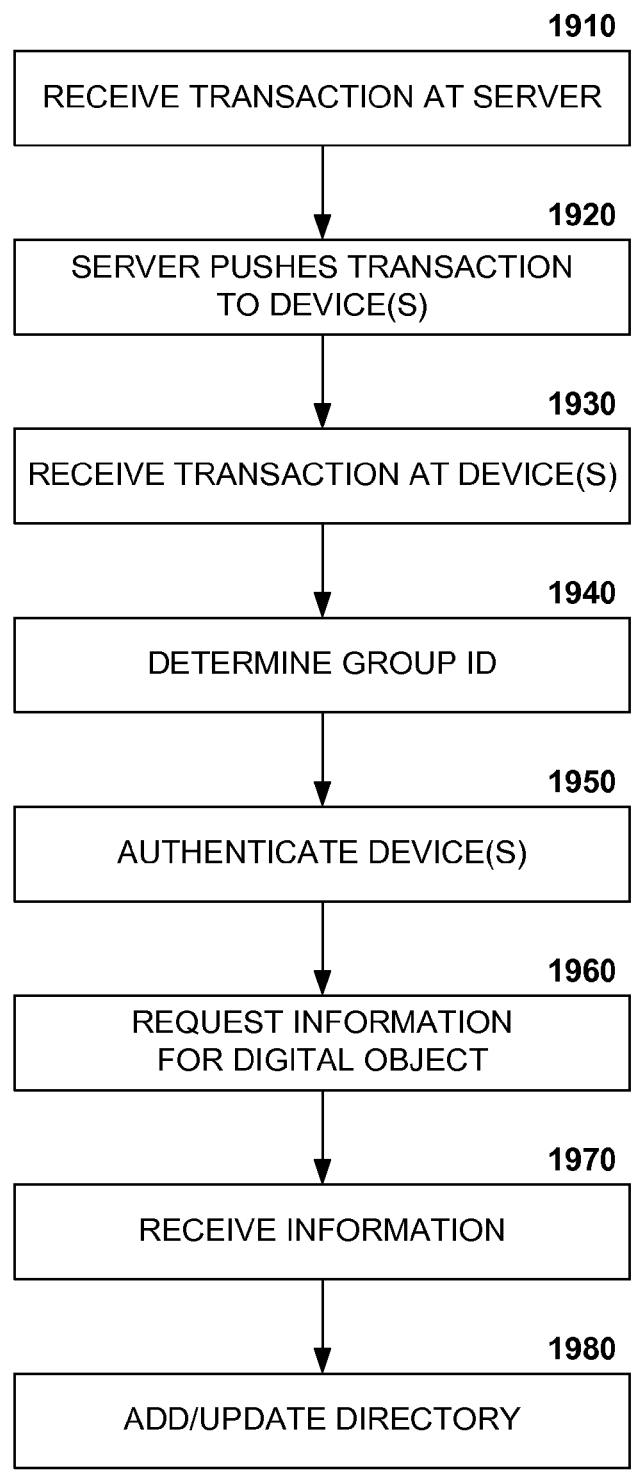
FIG. 19 is a flow diagram illustrating an exemplary, non-limiting embodiment for facilitating distribution and synchronization of a digital object.

FIG. 19 illustrates a flow diagram illustrating an exemplary, non-limiting embodiment for synchronization and distribution of digital objects between a server and other computing devices. The embodiment presented in FIG. 19 can be utilized by any components comprising FIGS. 14-17, and further, any components comprising FIGS. 21 and 23, which are described hereinafter.

In an embodiment, an originating device (e.g., device 1420A) can be communicatively coupled to a server (e.g., server 1410 of FIGS. 14 and 15), where the server can be in communication with a plurality of other devices (e.g., devices 1420B and 1420C) by any suitable communication means (e.g., as utilized by respective communications components 1470A-C&S). At 1910 the transaction (e.g., the transaction comprising $\#_0$ and $\#_1$, transaction 2315) and other information pertinent to the first instance of the digital object, is received at the server.

At 1920 the transaction and other pertinent information is forwarded by the server to any device(s) in communication with the server. It is to be noted that the transaction, as well as being forwarded to any device(s) associated with the Group ID, the transaction can also forwarded to any device that is not associated with the Group ID (e.g., FIG. 15, device 1420). Owing to the transaction only comprising hash(es) derived from the digital object, as opposed to actual data (e.g., renderable text of a word processing document) the only information known to a device that is not associated with the Group ID is that a transaction was received from the server.

At 1930 the transaction is received at any of the devices in communication with the server. As mentioned, the receiving device does not have to be a part of the Group ID to receive the transaction. Owing to the transaction not containing any actual data comprising the digital document, the transaction can be forwarded from the receiving device to any device connected thereto, thereby enabling the transaction to be rapidly disseminated throughout a network (e.g., any of networks 1430 and 1530).

At 1940 a determination can be made (e.g., by respective digital object determination component 1480A-C&S) at the receiving device as to whether the contents of the transaction pertain to the device, i.e., is the receiving device a part of the group identified by the Group ID? If the receiving device is not part of the group then the transaction can effectively be ignored by the receiving device. However, it can be possible for the receiving device to forward the transaction to other devices with are in communication with the receiving device.

At 1950, if the receiving device is included in the Group ID then the receiving device can attempt to request further information about the transaction contents, and based thereon, the digital object. As part of the requesting process, the receiving device has to be authenticated to the originating device. Any suitable authentication process (e.g., exchange of digital certificates) can be utilized (e.g., by respective authentication components 1490A-C&S) to ensure that the requesting device is a trusted device.

At 1960, upon successful completion of the authentication process, the receiving device can request further information regarding the digital object beyond that accompanying the transaction. For example, the request can include a request for the filename of the digital object, size of the digital object, etc.

At 1970 the requested information is received at the receiving device.

At 1980 the requested information is utilized to update the directory associated with the Group ID on the receiving device. The directory can be populated with information regarding all digital objects located on any of the devices associated with the Group ID. It is to be appreciated that only the information relating to the digital object(s) has been exchanged between devices at this point, and the digital object (e.g., the word processing document, the JPEG image, etc.) currently only reside on the device which originated the original transaction (e.g., the transaction including $\#_0$ and $\#_1$). Hence a high level of security can be enforced and maintained as an authentication process can be performed at any stage including original authentication of devices in a group (e.g., act 1740 of FIG. 17) and authentication to receive further information regarding the digital object relating to the transaction (e.g., act 1950 of FIG. 19).

Figure 20:
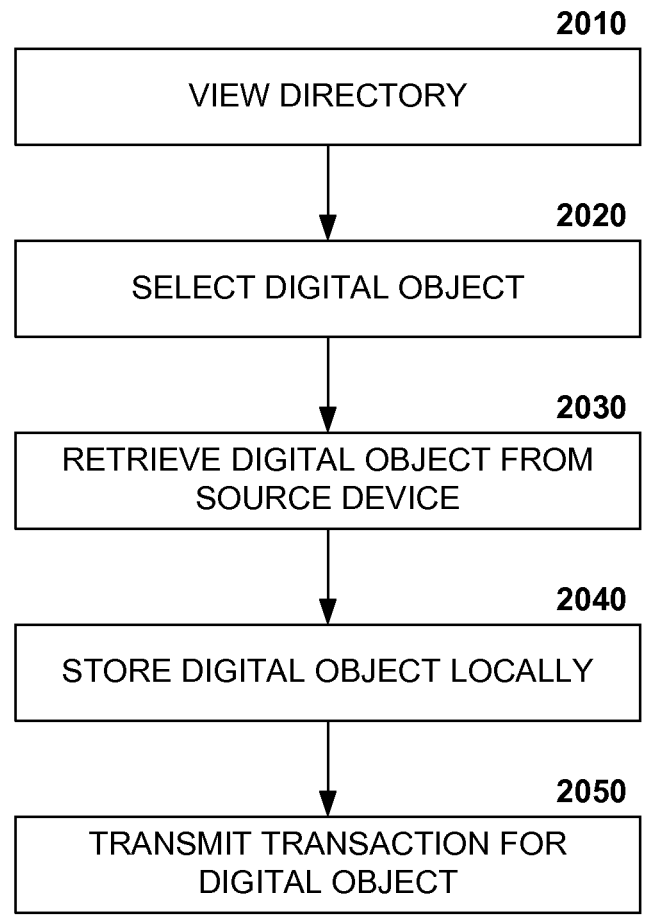
FIG. 20 is a flow diagram illustrating an exemplary, non-limiting embodiment for facilitating distribution and synchronization of a digital object.

FIG. 20 illustrates a flow diagram illustrating an exemplary, non-limiting embodiment for synchronization and distribution of digital objects between a server and other computing devices. The embodiment presented in FIG. 20 can be utilized by any components comprising FIGS. 14-17, and further, any components comprising FIGS. 21 and 23, which are described hereinafter.

Once information relating to a particular digital object has been incorporated into a Group ID directory (e.g., act 1980 of FIG. 19), the filename, etc., of the digital object, can be viewed. At 2010, a user can access the directory to view information regarding the digital object(s) associated with the Group ID.

At 2020, the digital object can be selected from the Group ID directory for download from the originating device to the requesting device.

At 2030 a request is passed from the requesting device to the originating device (if necessary, via any intermediate devices, e.g., server 1410) for the digital object to be forwarded from the originating device to the requesting device. While not shown, if required an authentication operation can be performed to confirm the identity of the requesting device. Upon receipt of the request, the digital object can be forwarded from the originating device to the requesting device (e.g., with reference to FIG. 21, digital object 1425 is forwarded from device 1420A to device 1420B).

At 2040 the digital object can be stored locally at the receiving device (e.g., in a memory incorporated or associated with the receiving device, such as memory 1465B of device 1420B)).

At 2050, upon storing the digital object, a transaction ($T_1$ comprising $\#_0$ and $\#_1$) can be transmitted from the requesting device to any devices in communication therewith that the digital object is now stored (and available) at the requesting device. As previously mentioned, a device address can be inferred from any protocol over which the requesting device communicates with other devices (e.g., TCP, UDP, and the like). Hence, when a subsequent device receives the transaction $T_1$ from the requesting device, the subsequent device can compare (e.g., by utilizing respective digital object determination component 1480A-C&S) the newly received transaction $T_1$ with any previously received $T_1$ transactions, and identify the source of each $T_1$ thereby compiling a list of devices from which $T_1$ is available and including the list of devices in the Group ID directory.

Figure 21:
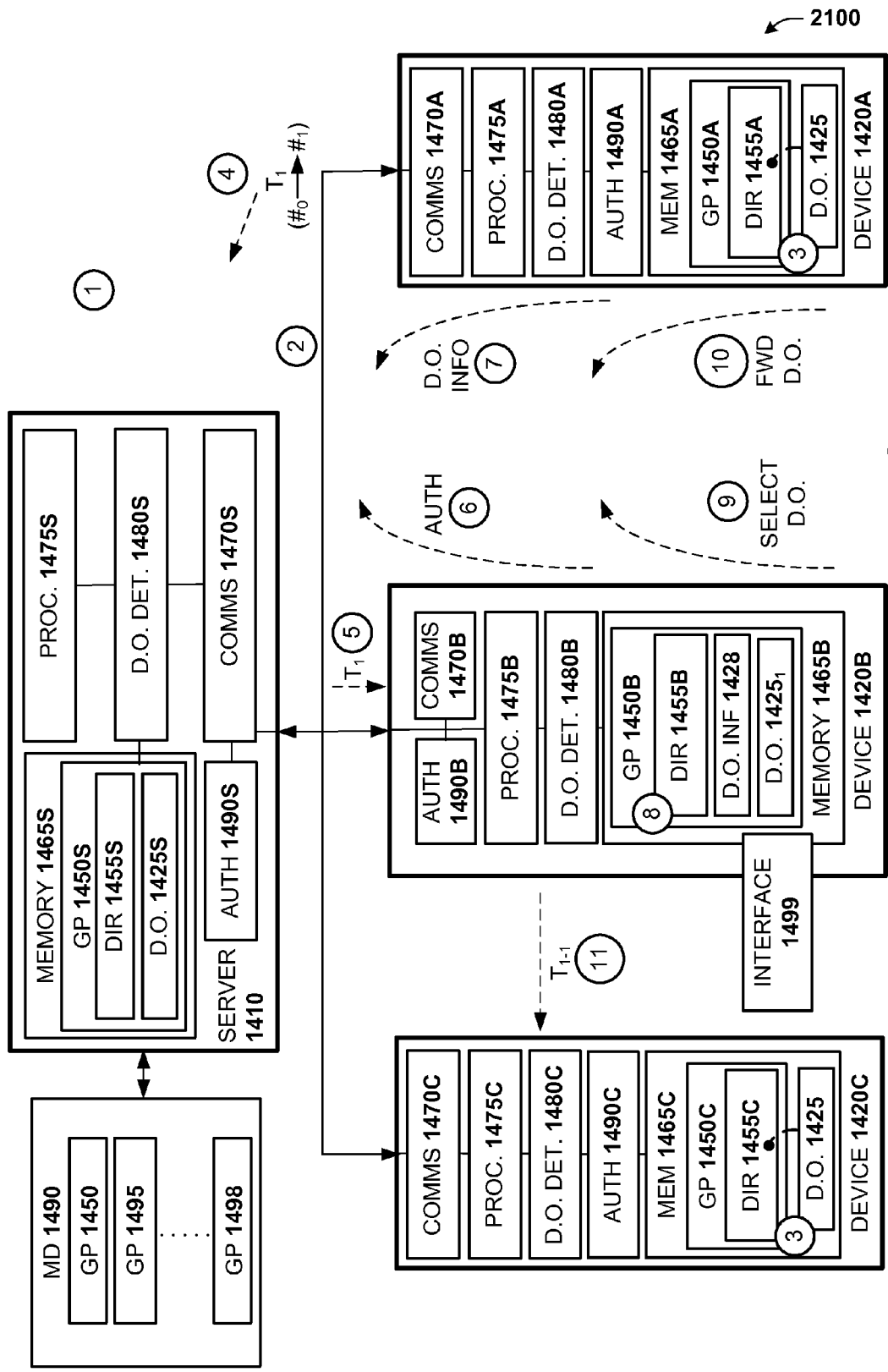
FIG. 21 is a block diagram illustrating an exemplary, non-limiting computing system configured to facilitate synchronization and exchange of digital object(s)

To facilitate understanding of the various acts presented in FIGS. 17-20 pertaining to the use of one-way hash(es) and distribution/synchronization of digital objects, FIG. 21 presents a block diagram illustrating a simplified operation of devices and components that may be involved in the various exemplary, non-limiting embodiments presented herein. The devices and communication therebetween is similar to that presented in FIG. 14, however it is to be appreciated that the concepts presented in relation to FIG. 21 relate to any system of devices in communication (e.g., FIGS. 15 and 16). FIG. 21 has been annotated to identify a possible sequence of operations performed during the creation and distribution of a digital object. At 1 the various devices (e.g., server 1410, devices 1420A-C) are obtained and configured to facilitate communication and transmission of data therebetween. At 2 communications are established between the various devices (e.g., via respective communication components 1470A-C&S across networks 1430, 1530, 1630, etc.) and the devices are grouped, whereby a group GP folder (e.g., group folders 1450A-C&S) is created on each device for that group and a file directory (e.g., group directories 1455A-C&S) for each group is also formed in respective memory components (e.g., memory 1465A-C&S) to facilitate presentation of group digital object data. For example, digital object data resides in a directory in the group folder to which the digital object data is associated. Presentation of the digital object data can be via an interface 1499 or display associated with device 1420B, wherein interface 1499 facilitates presentation of information regarding digital object(s) to a user of device 1420B and also facilitates interaction by the user, e.g., selecting a digital object for download, as described further herein. It is to be appreciated that, while not shown, corresponding interface(s) and display(s) can be available with server 1410, device 1420A and device 1420C to facilitate presentation and interaction with information presented on the respective devices.

At 3 a digital object (e.g., digital object 1425) is created on device 1420A. Upon creation of the digital object (e.g., when the digital object is saved to a memory 1465A associated with device 1420A), a pair of one-way hashes are generated. The first one-way hash, $\#_0$, is a zero value hash indicating that a digital object has been created/saved on the device. The second one-way hash, $\#_1$, can be generated from the digital information comprising the digital object (e.g., a word processing document, a JPEG image, etc.). The hashes $\#_0$ and $\#_1$ are combined to form a transaction, $T_1$, and associated with other information (e.g., any of time stamp, device address, digital signature, Group ID, etc.) pertaining to the digital object. At 4, transaction $T_1$ is transmitted from device 1420A to the other devices in communication therewith, e.g., server 1410, devices 1420B-C. In an exemplary, non-limiting embodiment, at 5, transaction $T_1$ is received at device 1420B, where, depending upon the intermediate device(s) and communication paths (e.g., network, peer-to-peer, etc.), receipt of the transaction can be via server 1410, device 1420C or directly from device 1420A. Upon receiving transaction $T_1$, the transaction is reviewed (e.g., by digital object determination component 1480B) wherein it is determined that the transaction contains a Group ID which includes device 1420B. At 6, device 1420B requests further information regarding the digital object referenced in transaction $T_1$, and an authentication is performed between device 1420B and device 1420A (e.g., between authentication components 1490A and 1490B, and via server 1410 and server authentication component 1490S, if necessary). Upon a successful authentication being performed, at 7 further information pertaining to digital object 1425 is forwarded from device 1420A to device 1420B. At 8, the further information pertaining to digital object 1425 is added to directory 1455B in the group folder 1450B on device 1420B, and the digital object information is presented therein as 1428. At 9, upon review of the digital object(s) in directory 1455B, the digital object info 1428 is determined to be of interest and digital object 1425 is selected for download from device 1420A to device 1420B.

At 10, in response to the request from device 1420B (and any necessary authentication process being successfully performed, e.g., between authentication components 1490A and 1490B) digital object 1425 is transferred from device 1420A to 1420B and stored thereon (e.g., in memory 1465B). Two copies of the digital object now exist, the original digital object 1425 in the memory 1465A of device 1420A and a copy digital object $1425_1$ on device 1420B.

At 11, device 1420B can forward a transaction $T_{1-1}$ notification to any other device(s) in communication with device 1420B (e.g., any of server 1410, device 1420A and device 1420C) that a copy of digital object 1425 (i.e., digital object $1425_1$) is available for download from device 1420B. Owing to digital object $1425_1$ being an unmodified copy of digital object 1425 (e.g., no changes have been made to the digital object residing on device 1420B) then $T_{1-1}$ contains the same information as $T_1$, e.g., hashes $\#_0$ and $\#_1$ and is accompanied by the same Group ID, however, $T_{1-1}$ can also be associated with a second time stamp indicating when digital object $1425_1$ was available for download from device 1420B, a device address for 1420B, a digital signature for 1420B, etc. Hence, any device receiving $T_1$ and/or $T_{1-1}$ will have sufficient information to retrieve any of the original digital object 1425 and/or the digital object copy $1425_1$.

Figure 24:
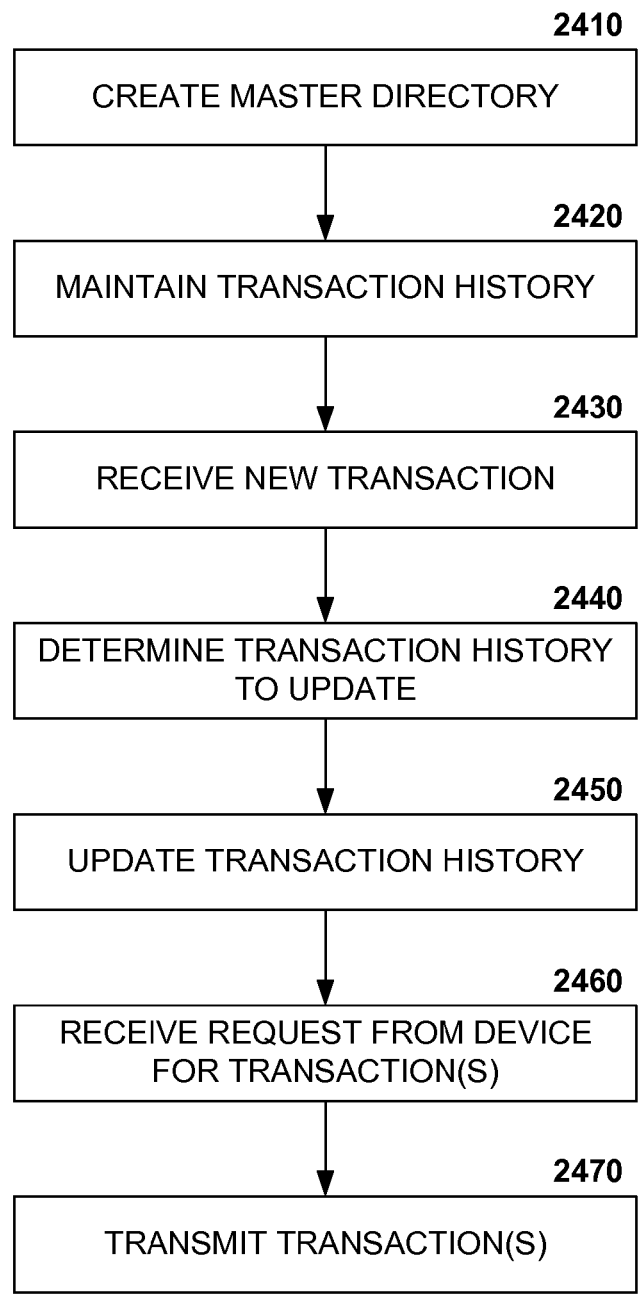
FIG. 24 is a flow diagram illustrating an exemplary, non-limiting embodiment for facilitating distribution and synchronization of a digital object.

Further, as illustrated in FIG. 21, a master directory 1490 can be associated with any of the computing devices (e.g., any of server 1410, devices 1420-1430). In the exemplary, non-limiting embodiment, master directory 1490 is associated with server 1410, and comprises a plurality of group folders 1450, 1495, 1498, etc. Master directory 1490 can be utilized to store transactions and information for each group of devices (e.g., by Group ID) enabling a device to synchronize with the master directory 1490 to ensure that the device has current information regarding digital objects which comprise any group(s) which the device is associated with. (Ref. FIG. 24 for further description of the master directory).

As shown in FIG. 21, authentication components 1490A-C&S, communications components 1470A-C&S, digital object determination components 1480A-C&S can operate in association with respective processors 1475A-C&S and memories 1465A-C&S to facilitate operation of the respective embodiments presented herein.

Figure 22:
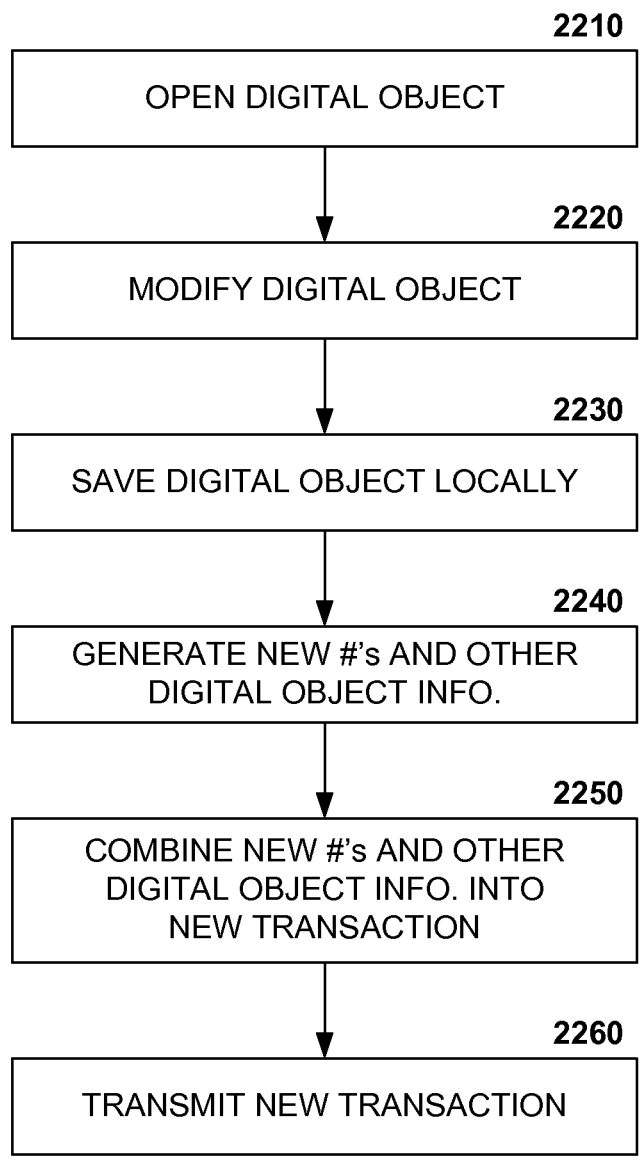
FIG. 22 is a flow diagram illustrating an exemplary, non-limiting embodiment for facilitating distribution and synchronization of a digital object.

FIG. 22 is a flow diagram illustrating an exemplary, non-limiting embodiment for modifying a digital object. At 2210, a digital object is opened (e.g., FIG. 21, digital object 1425 on device 1420A or digital object 1425$_1$ on device 1420B). For illustrative purposes the following description will present a modification of digital object 1425$_1$ on device 1420B, however the description can pertain to any digital object being modified, e.g., an original digital object (e.g., digital object 1425) or a copy of an original digital object (e.g., digital object 1425$_1$). It is to be further appreciated that the process of modifying a digital object and generating new information regarding the modified digital object not only pertains to modifying an original digital object, but also applies any of one or more modifications to any copy of a digital object and not just an original digital object.

At 2210, digital object 1425$_1$ is opened, e.g., digital object 1425$_1$ is stored locally on device 1420B and is selected from directory 1455B for viewing.

At 2220, digital object 1425$_1$ is modified/edited/amended. For example, the content of a word processing document is edited, a JPEG image is edited in a graphics editing program, a drawing file is saved with a different filename to that of the original drawing file, and the like.

At 2230, the modified digital object 1425$_1$ is saved locally (e.g., FIG. 21, in memory 1465B of device 1420B).

At 2240 owing to the digital object 1425$_1$ being modified, in effect a new version of digital object 1425$_1$ (and also digital object 1425) now exists on device 1420B. A new one-way hash #$_2$ is created based on the new content of the modified digital object 1425$_1$ which for the purposes of understanding the modified digital object is referenced as 1425$_{1-2}$. Owing to the content of 1425$_{1-2}$ being different to 1425$_1$, #$_2$ will be of a different value to #$_1$. Other generated information pertaining to the modified digital object can include a time stamp for when 1425$_{1-2}$ was created (e.g., saved to memory 1465B), a device address for 1420B, a digital signature for 1420B, etc. The Group ID is likely to remain the same (e.g., 1450) however, during saving of 1425$_{1-2}$ a different Group ID can be selected for a different group which includes device 1420B and for which digital object 1425$_{1-2}$ is to be made available.

At 2250 a transaction to indicate creation of digital object 1425$_{1-2}$ is generated, wherein the transaction can include #$_1$ and #$_2$, and the transaction is associated with any of a time stamp, device address for 1420B, a digital signature for 1420B, the Group ID, etc.

At 2260 the transaction for digital object 1425$_{1-2}$ is transmitted to any devices in communication with device 1420B (e.g., FIG. 21, server 1410, device 1420A, device 1420C, etc.)

It is to be appreciated that the various concepts presented in FIG. 22 can be performed any time a digital object is modified, and a transaction created which includes the one-way hash for the original digital object (e.g., #$_1$ for digital object 14250 and the one-way hash for the modified version of the digital object (e.g., #$_2$ for digital object 1425$_{1-2}$). By monitoring the series of one-way hash(es) received, it is possible for a device (e.g., any of server 1410, devices 1420A-D) to track where the most recent version of a digital object resides.

Figure 23:
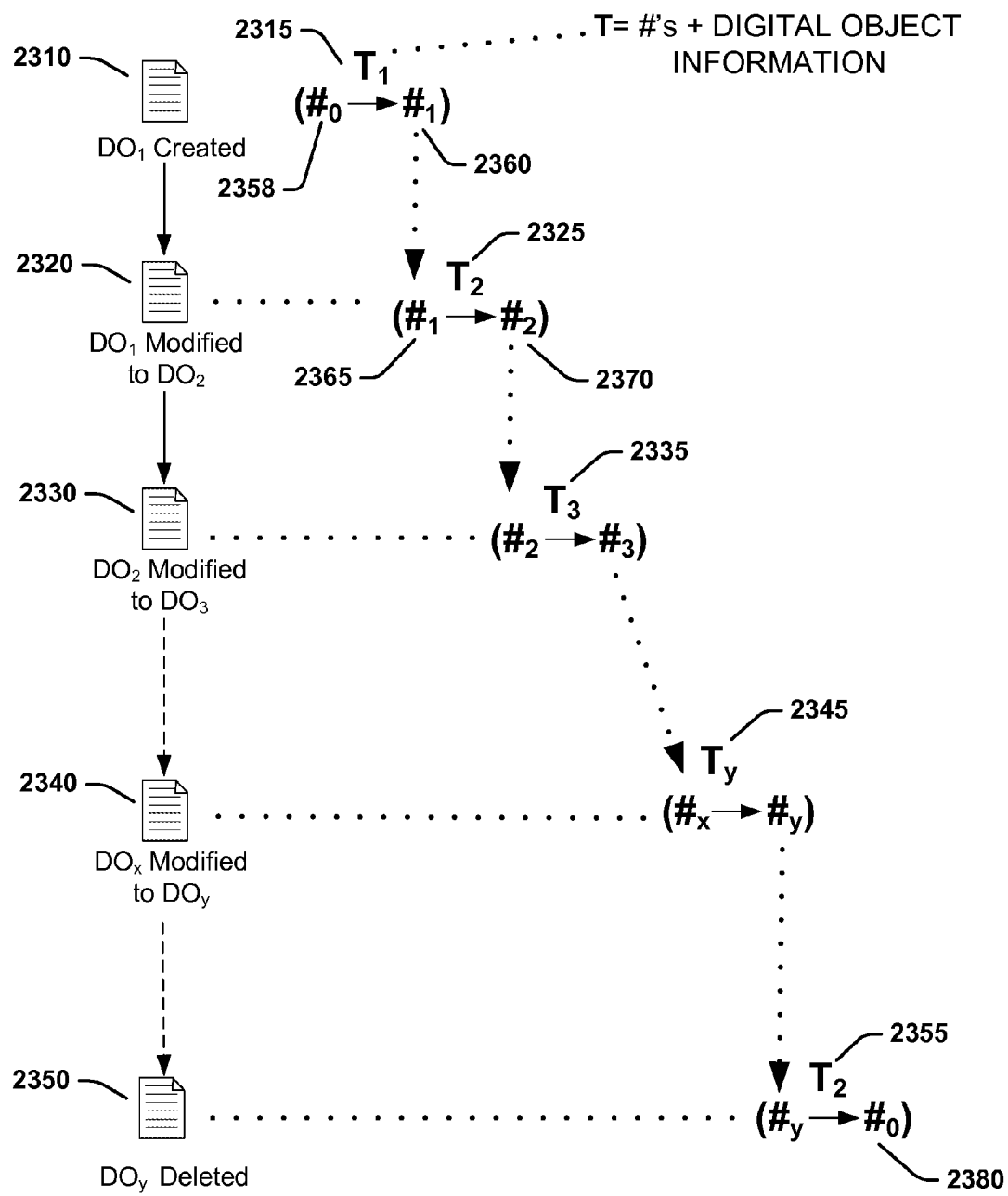
FIG. 23 is a depiction of an exemplary, non-limiting embodiment for generating transactions at digital object creation and/or modification.

FIG. 23 illustrates the concept of transaction(s) and one-way hash(es) being generated at each modification of a digital object.

FIG. 23, is a block diagram illustrating an exemplary, non-limiting embodiment of a digital object being created and modified with corresponding generation of a series of one-way hashes. At 2310 a digital object DO$_1$ is created (as described above, e.g., with reference to FIGS. 18 and 21). Correspondingly, at 2315, one-way hashes #$_0$ (2358) and #$_1$(2360) are generated, where #$_0$ is a null-value one-way hash indicating a digital object has been created and #$_1$ is a one-way hash generated from the data comprising digital object DO$_1$. Hashes #$_0$ and #$_1$ are included in a transaction T$_1$, wherein T$_1$ is associated with any other pertinent information (e.g., Group ID, device address, device signature, etc., as previously described), wherein transaction T$_1$ is transmitted to any devices in communication with the device creating DO$_1$.

At 2320, DO$_1$ is modified with the saved modification being saved as DO$_2$. As shown at 2325, one way hash #$_2$ (2370) is created from the data comprising DO$_2$ and combined with #$_1$ in transaction T$_2$, and accompanied by any other information pertaining to DO$_2$, such as Group ID, device address, device signature, and the like, as previously described. If DO$_2$ is created on the same device as DO$_1$, and the Group ID is the same for both, then the device addresses and Group ID's are likely to be common between both transactions T$_1$ and T$_2$, while the time stamps may be different with a first time stamp being recorded at the time of creation of DO$_1$ and a second time stamp being created at the modification of DO$_1$ (e.g., creation of DO$_2$). Transaction T$_2$ is transmitted to any devices in communication with the device modifying DO$_2$.

The process of creation of a new one-way hash and reporting the new one-way hash and previous one-way hash continues upon each modification of the digital object. Hence at 2330, DO$_2$ is modified with the creation of DO$_3$ and corresponding one-way hash #$_3$, whereupon at 2335 transaction T$_3$ is generated comprising #$_2$ and #$_3$, and can be accompanied by other information pertaining to DO$_3$ (e.g., Group ID, device address, device signature, etc., as previously described).

The operation of detecting a modification to a digital object (e.g., saving the digital object to memory (e.g., any memory 1465A-C&S), creating a new one-way hash and then transmitting the new one-way hash and previous one-way hash, along with other information pertaining to the modified digital object, can be performed as many times as necessary to indicate the digital object continuing to be modified, as indicated at 2340 where digital object has been modified from DOx to DOy, with corresponding one-way hashes #$_x$ and #$_y$ being generated and included in transaction T$_y$, where y indicates a subsequent modification to a version x of a digital document.

It is to be appreciated that in order to maintain a history of modifications to a document and location of a current version of the document only the information contained in the last generated transaction (e.g., transaction T$_y$ (2345) of FIG. 23) is required to be stored and any previous transactions in the chain of transactions can be discarded from memory. Hence, returning to FIG. 23, between the operation of creating the digital object D$_1$ and the creation of digital object D$_2$ (e.g., based on the modification of D$_1$) where a device initially stores a received transaction T$_1$ from 2315, upon receipt of the next transaction, T$_2$, owing to #$_1$ being common to both transactions (in T$_1$, #$_1$ is the modified one-way hash (2360), while in T$_2$, #$_1$ is the originating one-way hash (2365)) it is possible to determine that transition T$_2$ is a transaction reporting an updated digital object (digital object DO$_2$) based on originating digital object (digital object DO$_1$) as reported in T$_1$ and accordingly only the one-way hashes #$_1$ and #$_2$ included in T$_2$ and other information associated with T$_2$ needs to be stored (e.g., in any memory for location of the most recent version of the digital object (e.g., digital object DO$_2$) and the data comprising T$_1$ can be deleted from memory, if required.

Further a digital object may be deleted from a device or system, such as at 2350, where digital object DOy is deleted. When a digital object is deleted, a zero hash, $\#_0$ can again be generated as the modified one-way hash 2380. Owing to $\#_0$ being the modified one-way hash 2380, as opposed to the originating one-way hash 2358, it is possible to make a determination (e.g., by any determination component 1480A-C&S) that the digital object has been deleted, no longer exists.

An aspect of the various embodiments presented herein is the emergent behavior of how the various transactions multiply and propagate. From the relatively simple rules associated with generating a new one-way hash upon creation/modification of a digital object and transmission of the new one-way hash(es) (e.g., via a transaction) between communicatively coupled devices, it does not require many iterations before knowledge of a transaction occurring has propagated across a system. A transaction can be generated at a first device, communicated to a server, and then "splashed" out to any number of devices forming a part of the group, and even to devices which are not a part of the group. As previously described, a transaction can be accompanied by any information required to facilitate understanding of what device(s), etc., the transaction pertains to. Such information can include a "Group ID" which can be utilized to identify which devices on a network (e.g., LAN, cellular network, etc.) the transaction pertains to. Hence, as a transaction (and associated information) is propagating throughout a network(s) if a recipient device is part of the "Group ID" then the transaction can be acted upon by the various components comprising the device. If the recipient device is not part of the "Group ID" then the transaction can be ignored but forwarded on to any devices that are communicatively coupled to the recipient device. Hence, the emergent behavior of transaction(s) being received at any number of devices and then propagating (aka, "splashing") out to any devices connected thereto in a benevolently viral manner. The rate of propagation across any number of networks can be based in part on the communication rate of a network/communication method communicatively coupling devices. For example, for devices coupled via BLUETOOTH wireless PAN (2.4 GHz band) communication rates in the order of 720 kbps may be encountered, whereas for devices communicating via IEEE 802.11g wireless WLAN (2.4 GHz band) rates of 54 Mbps may be encountered and on a Ethernet (IEEE 802.3ae) rates of 10 Gbps may be realized. Hence, a transaction can be forwarded faster across a high communication rate network than across a slower rate network, but given sufficient time the transaction will have propagated across any number of devices connected to any number of networks which are communicatively coupled (either directly or indirectly) with the device generating the transaction (e.g., generating a new one-way hash in view of creation/modification of a digital object).

It is to be appreciated that server 1410, or other device (any of devices 1420A-C) can maintain a master directory of all the transactions which have been generated as digital objects are created and modified. As a fallback measure, any device can request from the master directory the latest information regarding one or more digital objects thereby enabling a device to have the latest transaction information. Such an operation can be of import when a device goes off-line (as a result of a communications failure, power down, operator activity, etc.), a new device is added to a communications network, a user replaces their device, a new device is added to a Group of devices, a situation occurs such that confidence in having the most recent transactions is not 100%, etc.

FIG. 24 is a flow diagram illustrating an exemplary, non-limiting embodiment to facilitate maintenance of a transaction history. At 2410, a master directory (e.g., 1490) is created on a device (e.g., any of server 1410, devices 1420A-C, etc.), wherein the master directory can be created such that it is utilized to maintain a transaction history for a particular Group of devices (e.g., group ID 1450 devices), a directory is created to maintain a transaction history for a plurality of device Groups (e.g., group ID devices 1450, 1495, 1498), etc.

At 2420 the master directory is configured to maintain the transaction history(ies), e.g., a Group(s) of devices is associated with the master directory.

At 2430 a new transaction is received, e.g., a digital object has been modified.

At 2440, a determination is made (e.g., in conjunction with any determination component 1480A-C&S)) as to which transaction history is to be updated. For example, with reference to FIG. 23, a master directory has already been created and associated with the Group of devices associated with transactions relating to digital object $DO_1$. As a transaction is received (e.g., the sequence of transactions $T_1$-$T_y$) the originating one-way hash is identified (e.g., $\#_0$ of $T_1$, $\#_1$ of $T_2$, $\#_2$ of $T_3$, $\#_x$ of $T_y$, etc.) and accordingly, group directory in the master directory in which the transaction is to be stored is also identified.

At 2450, the newly received transaction is stored in the group directory in the master directory, whereby the modified one-way hash (e.g., depending upon sequence timing, $\#_1$ (2360) of $T_1$, $\#_2$ (2370) of $T_2$, etc.) can be utilized to identify the sequence of transactions with which the next subsequent transaction (e.g., $T_3$) is received upon modification of $DO_2$ to $DO_3$.

At 2460 a request can be received from a device for the current transaction(s) pertaining to the device to be forwarded to the device. In one aspect, all of the transaction histories compiled from all the devices associated the device (e.g., directly or indirectly) maintained in the master directory can be forwarded to the requesting device. In an alternative aspect, just the transactions in the Group(s) associated with the requesting device can be forwarded. In a further aspect any other portion of the master directory as required to facilitate operation of the embodiment(s) presented herein can be forwarded to a requesting device.

At 2470, the transaction(s) are transmitted to the requesting device.

Figure 25:
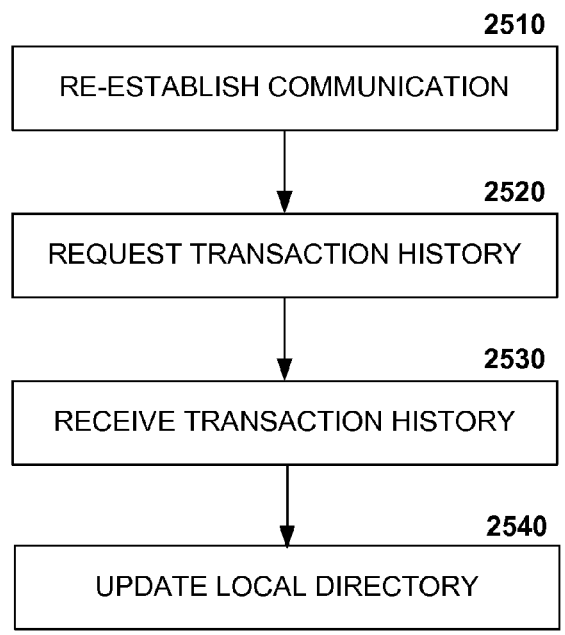
FIG. 25 is a flow diagram illustrating an exemplary, non-limiting embodiment for facilitating distribution and synchronization of a digital object.

FIG. 25, is a flow diagram illustrating an exemplary, non-limiting embodiment to facilitate a first device obtaining a transaction history(ies) after being communicatively offline. At 2510, a first device (e.g., any of 1410 or 1420A-C) re-establishes communication with a second device (e.g., any of 1410 or 1420A-C) maintaining a transaction history (e.g., a master directory 1490, or a group folder 1450, 1495, 1498, etc.). In one aspect the first device can request a transaction history from any device with which the first device is communicatively coupled. For example, the first device can request a transaction history from a second device with which the device is in communication with in a peer-to-peer fashion. In a further aspect, the second device may only have a partial history of transactions and forwards the partial list, wherein the second device may be in a first Group (e.g., group 1450) which includes the first device, but the first device is a member of other Group(s) (e.g., groups 1495, 1498) and hence the first device may need to communicate with other device(s) to obtain a full transaction history of all transactions associated with the first device and the Group(s) which the first device is associated with. In a further aspect, the second device may have a complete transaction history (as may be maintained at server 1410, e.g., master group directory 1490) and forwards the complete transaction history to the first device.

At 2540, the first device can review the one or more received transactions and hence compile a transaction list with which to update the local directory, or in the case where a plurality of directories exist in accord with the first device being associated with a plurality of Groups, review the received transactions and update the plurality of Group directories accordingly. With reference to FIG. 23, it is to be appreciated that the whole transaction history neither needs to be transmitted or stored at the first device. As shown in FIG. 23, the first device only needs the most recent transaction(s) from which the corresponding originating one-way hash and modified one-way hash for the most recent version of the digital object sequence can be obtained. Hence, any duplicate transactions and prior to most recent transaction can be ignored or deleted.

Figure 26:
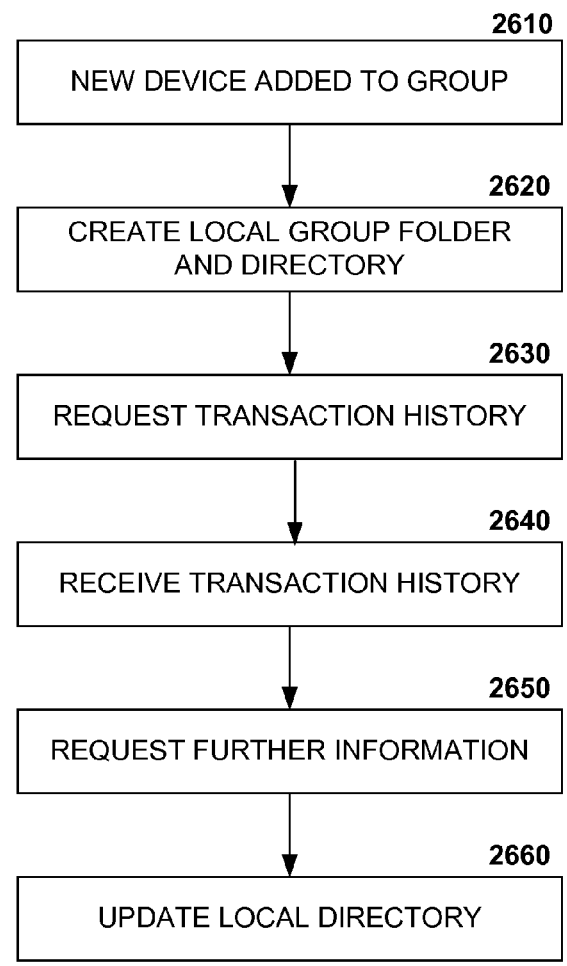
FIG. 26 is a flow diagram illustrating an exemplary, non-limiting embodiment for facilitating distribution and synchronization of a digital object.

FIG. 26 is a flow chart illustrating an exemplary, non-limiting embodiment facilitating a new device to be added to a Group. While a Group of devices may already be established with digital object(s) being created and modified, accompanied by creation of transactions, a situation can occur where a device is to be added to the existing Group. At 2610, a new device is added to pre-existing Group. As part of the addition process any suitable authentication (e.g., by any of authentication components 1490A-C&S) process can be performed between the new device and the devices comprising the pre-existing group, thereby establishing trust between the devices.

At 2620, to facilitate transactions, etc., being stored on the new device, a Group folder (e.g., a group folder associated with any of groups 1450, 1495, 1498, etc.) is created locally on the new device and a directory for storage and presentation of any digital object(s) pertaining to the group.

At 2630, the new device can place a request with any device, and particularly any device comprising the Group, for copies of the most recent transactions (and if required, a full or partial transaction history) associated with digital objects associated with the Group. Such a request can be placed with any device in communication with the new device, such as a server maintaining a transaction history for the Group, another device in the Group that has all, or a portion, of the Group transactions, or any other device that may be able to provide transactions relating to the Group of which the new device is now a part.

At 2640, a portion, or all of the Group transactions are received from a device in response to the previous request.

At 2650, from the received Group transactions, the various information pertaining to the digital object(s) represented by the received Group transactions is determined, and further information regarding the digital objects can be requested.

At 2660, further information can be received (e.g., filename of digital object(s), etc.) which is utilized to populate the local directory in the Group folder on the new device. It is to be appreciated that any authentication process(es) can be performed between the new device and a device which contains further information regarding a digital object (e.g., a device which has the digital object stored thereon) to establish trust between the devices before the further information is forwarded to the new device, as previously described. In accord with information presented in the local directory, a request can be placed for downloading of a particular digital object (as described previously, e.g., FIG. 20) to the new device.

Figure 27:
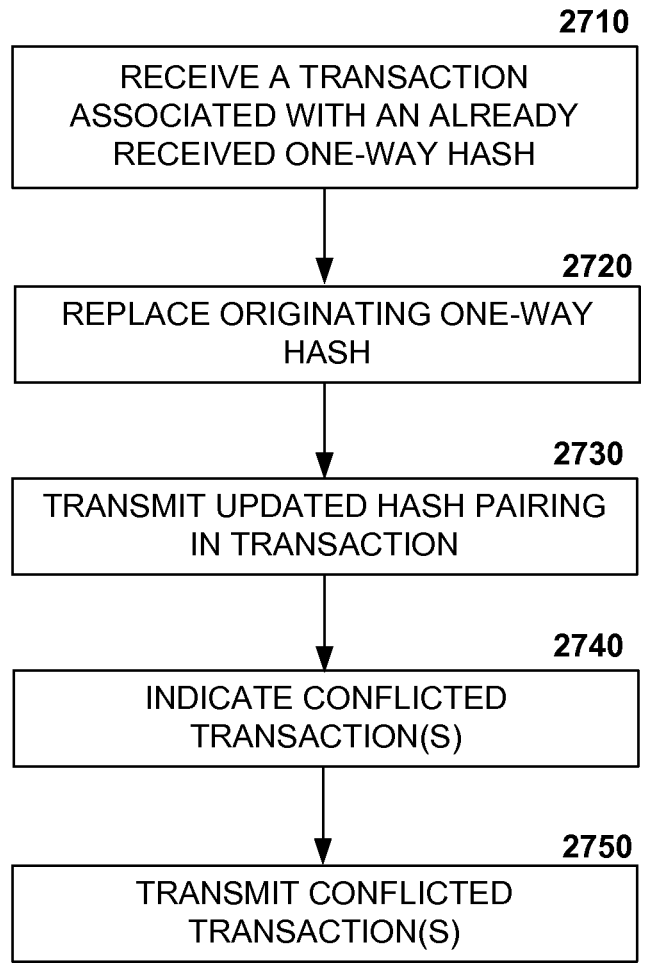
FIG. 27 is a flow diagram illustrating an exemplary, non-limiting embodiment for facilitating distribution and synchronization of a digital object.

FIG. 27 illustrates an exemplary, non-limiting embodiment for when a conflict arises as digital objects are modified. A situation can arise where two or more devices have the same version of a digital object open and modifications are being made to the digital object on each respective device. However, it is unlikely that (a) changes will be saved to each respective device at exactly the same time (e.g., same instance of processor clock), or (b) the changes are received at a central device (e.g., server 1410) at exactly the same time. Hence, to address situations of conflict a process of assigning priority to the first received transaction can be utilized. For example, a first device (e.g., device 1420A) creates a digital object and a transaction (e.g., T1 comprising $\#_0$ and $\#_1$) is forwarded to a plurality of devices associated with the device (e.g., server 1410, devices 1420B-C). Subsequently, both devices 1420B and 1420C both request a copy of the digital object (e.g., digital object 1425) from the first device. The copies of the digital object are opened on each device (e.g., digital object 14251 is opened on device 1420B, and a similar operation is performed on device 1420C), modifications made to each copy and subsequently transactions are sent from both device 1420B and 1420C that a modified digital object exists on the respective devices. Server 1410 can be monitoring the changes in the one-way hashes being generated in the various transactions and can determine (e.g., by processor 1475S, digital object determination component 1470S, etc.) that a transaction conflict has occurred.

At 2710, a transaction is received (e.g., at server 1410) that has the same originating one-way hash (e.g., ref. FIG. 23, #1, (2365)) as a previously received transaction, but the modification one-way hash (e.g., a hash at 2370) in the newly received transaction is different to the previously received transaction.

At 2720, based on the different pairings of #x and #y, it is determined that a transaction conflict has occurred. Accordingly, the modification one-way hash in the first received transaction is used to replace the originating one-way hash on the second received transaction, thereby maintaining the one-way hash sequence across the series of received transactions.

At 2730, a transaction comprising the new one-way hash pairing is transmitted to the various receiving devices.

At 2740, an indication can also be sent to the various receiving devices that there has been a conflict between digital objects.

At 2750, an indication of the conflicted transaction can also be transmitted, thereby enabling the two respective digital objects to be obtained and the differences between the digital objects to be established, and correction of the documents to be made as necessary.

Figure 28:
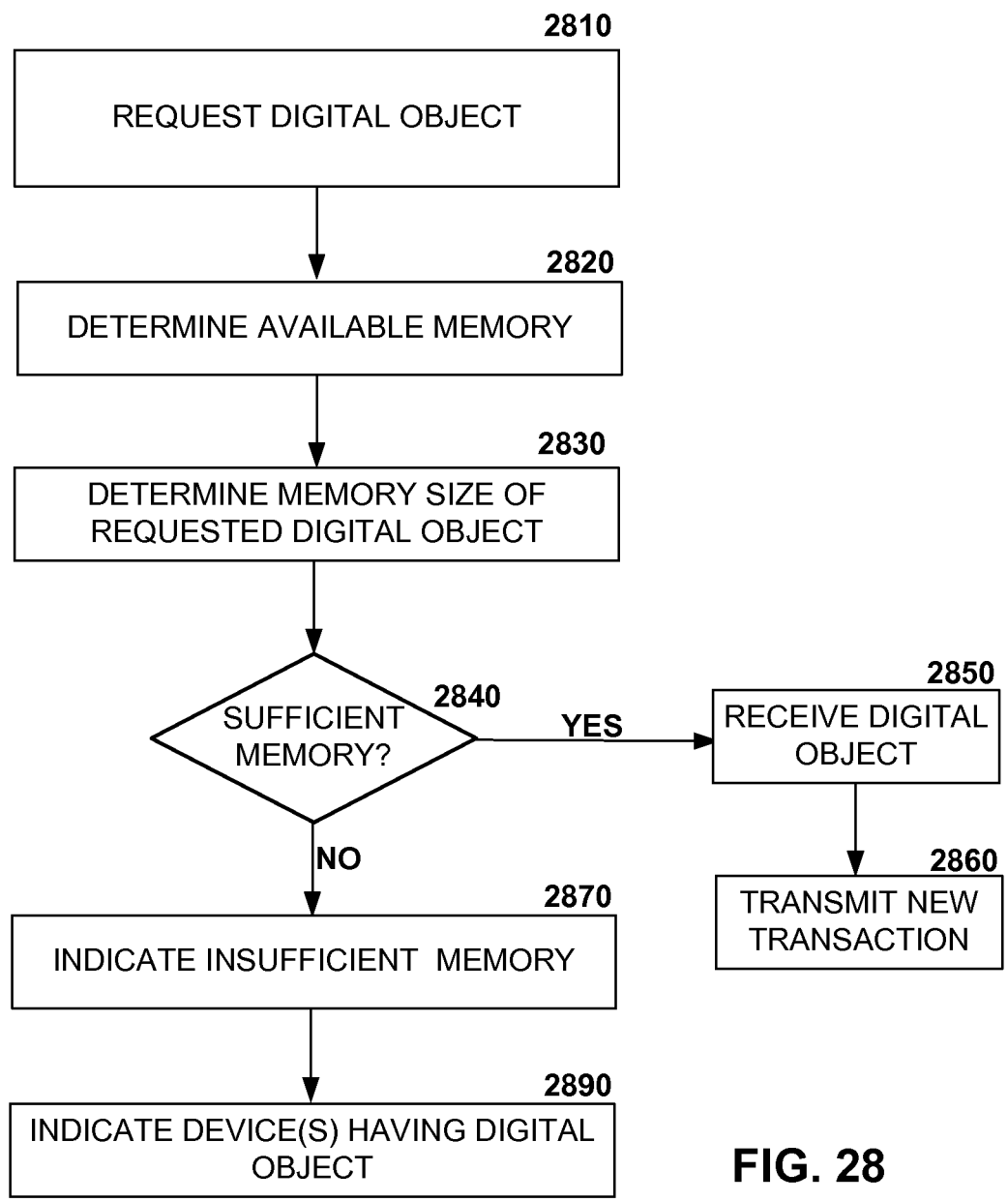
FIG. 28 is a flow diagram illustrating an exemplary, non-limiting embodiment for facilitating distribution and synchronization of a digital object.

A situation can arise where the memory size of the digital object (e.g., digital object 1425) is greater than the available memory (e.g., memory 1465B) on a device requesting a copy of the digital object. FIG. 28 illustrates an exemplary, non-limiting embodiment to determine memory requirements of a digital object versus available memory. At 2810 a first device (e.g., device 1420B) requests a copy of a digital object (e.g., digital object 1420A) to be forwarded. At 2820, a determination (e.g., by processor 1475B in conjunction with memory 1465B) can be made regarding the amount of memory available on the requesting device. At 2830, the memory requirement(s) of the digital object can be determined, e.g., from the information previously stored in the directory (e.g., directory 1455B).

At 2840, a determination (e.g., by processor 1475B in conjunction with memory 1465B) as to whether the requesting device has sufficient memory is performed. In response to a determination that sufficient memory exists, at 2850, the digital object is received at the requesting device. At 2860, a new transaction can be transmitted from the requesting device, to any other devices, indicating that a copy of the digital object resides on the receiving device and is available for download.

At 2870, in response to a determination that insufficient memory exists on the requesting device, an indication is presented indicating insufficient memory is available and the digital object cannot be received at the requesting device. At 2890, a determination can be made as to which device(s) has the digital object and the list of determined devices can be presented enabling an interested party to utilize any of the determined devices to present the digital object. It is to be appreciated, that as previously described, old/unwanted digital objects can be deleted from the memory, thereby enabling the digital object to be received at 2850.

Figure 29:
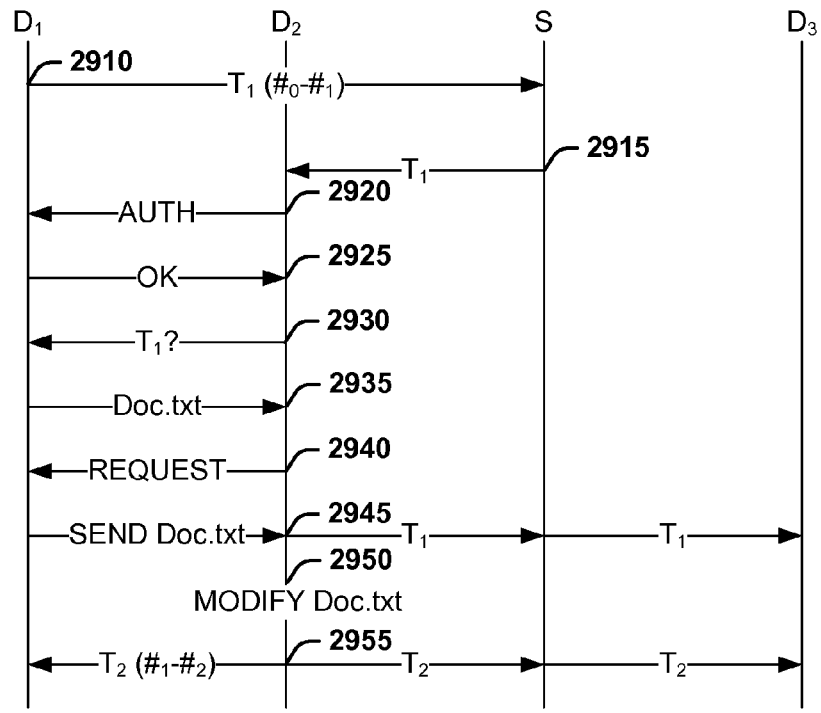
FIG. 29 is a depiction of an exemplary, non-limiting embodiment for generating transactions at digital object creation and obtaining the digital object.

To further facilitate understanding, a computer ladder-logic depiction is presented in FIG. 29, and is presented to illustrate various exemplary, non-limiting embodiments as previously described. At 2910 a new digital object (e.g., digital object 1425) is created at device $D_1$, and a transaction $T_1$, comprising a zero value one way hash $\#_0$ and a one-way hash $\#_1$ generated from the content of the digital object, is transmitted from device $D_1$. Transaction $T_1$ can be received at $D_2$, as well as being forwarded to device $D_2$ via server S (e.g., server 1410), at 2915. At 2920, device $D_2$ can make an authentication with $D_1$. Upon acknowledgement of a successful authentication, at 2925, device $D_2$ can, at 2930, request further information regarding the digital object associated with $T_1$. At 2935, $D_1$ informs $D_2$ that the digital object is a word processing file, Doc.txt. At 2940, $D_2$ requests Doc.txt from $D_1$. At 2945, Doc.txt is forwarded from $D_1$ to $D_2$, and upon receipt of Doc.txt, $D_2$ can transmit transaction $T_1$ to server S as well as a further device $D_3$ associated with device $D_2$ and/or server S. At 2950, the digital object is modified at $D_2$, whereupon a new transaction $T_2$ ($\#_1$-$\#_2$) is forwarded to server S, device $D_1$ and $D_3$ which are in communication (either directly or indirectly) with $D_2$.

Figure 30:
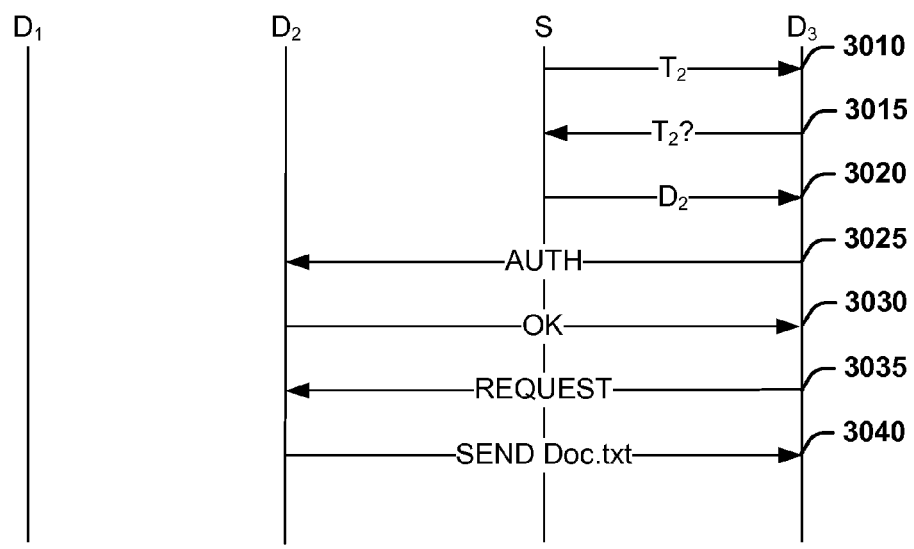
FIG. 30 is a depiction of an exemplary, non-limiting embodiment for obtaining a transaction when a device goes back on-line.

To further facilitate understanding, a computer ladder-logic depiction is presented in FIG. 30, and is presented to illustrate various exemplary, non-limiting embodiments as previously described. At 3010 device $D_3$ establishes communication (e.g., is back online, is added to a network, etc.) with server S, and at 3010 receives from server S a transaction $T_2$ associated with a digital object residing on a device associated with server S and device $D_3$. At 3015 $D_3$ places a request asking which device generated T2, whereupon at 3020, S replies device $D_2$. At 3025, device $D_3$ authenticates with $D_2$, which is acknowledged at 3030. At 3035, $D_3$ requests further information regarding the digital object, and based thereon, at 3040, $D_2$ sends to $D_3$ Doc.txt.

Exemplary Networked and Distributed Environments

One of ordinary skill in the art can appreciate that the various embodiments of a design apparatus for industrial automation environment applications and associated methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the design apparatus as described for various embodiments of the subject disclosure.

Figure 31:
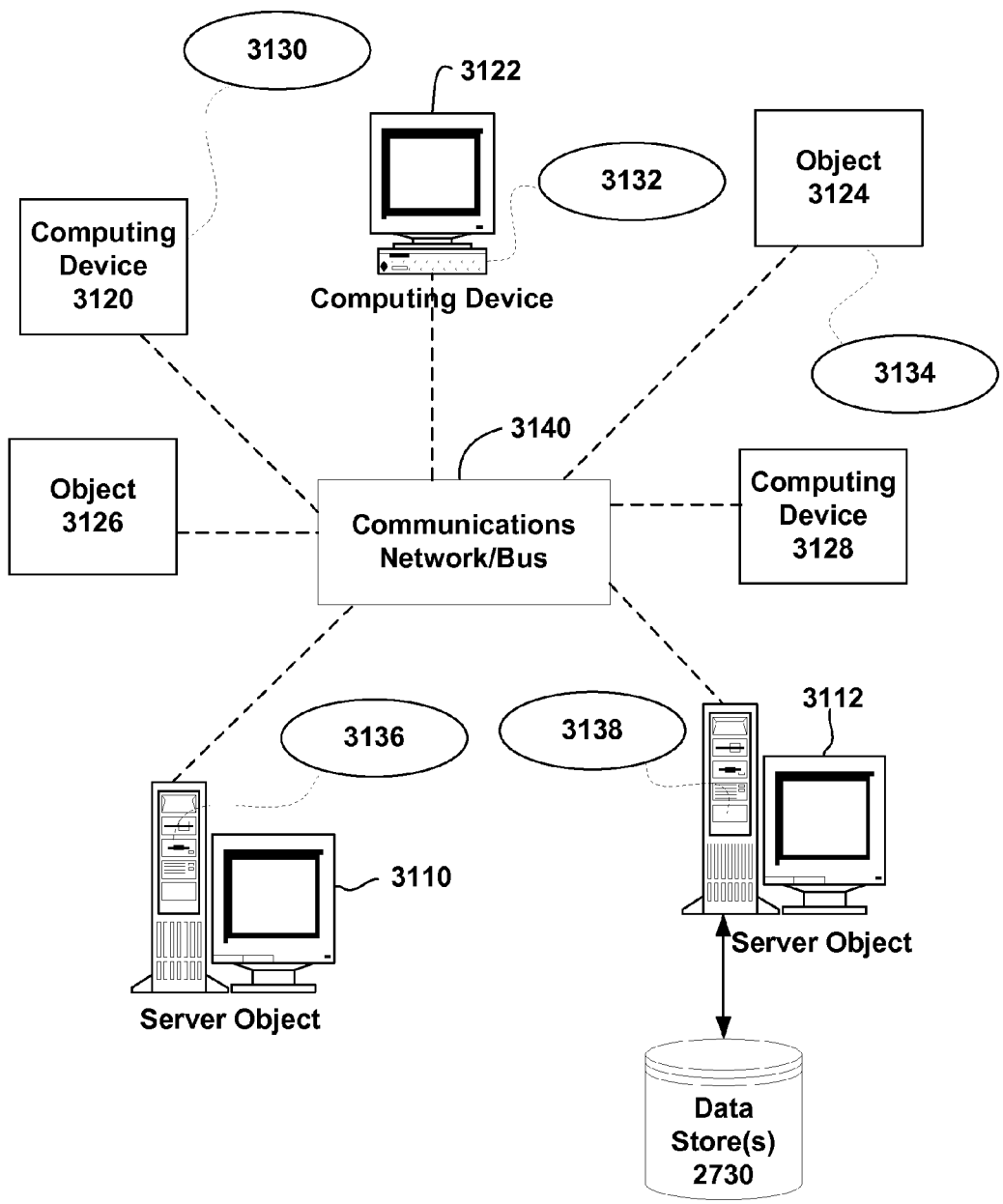
FIG. 31 is a block diagram representing exemplary non-limiting networked environments in which various embodiments described herein can be implemented.

FIG. 31 provides a schematic diagram of an exemplary networked or distributed computing environment. The distributed computing environment comprises computing objects 3110, 3112, etc. and computing objects or devices 3120, 3122, 3124, 3126, 3128, etc., which may include programs, methods, data stores, programmable logic, etc., as represented by applications 3130, 3132, 3134, 3136, 3138. It can be appreciated that computing objects 3110, 3112, etc. and computing objects or devices 3120, 3122, 3124, 3126, 3128, etc. may comprise different devices, such as personal digital assistants (PDAs), audio/video devices, mobile phones, MP3 players, personal computers, laptops, etc.

Each computing object 3110, 3112, etc. and computing objects or devices 3120, 3122, 3124, 3126, 3128, etc. can communicate with one or more other computing objects 3110, 3112, etc. and computing objects or devices 3120, 3122, 3124, 3126, 3128, etc. by way of the communications network 3140, either directly or indirectly. Even though illustrated as a single element in FIG. 31, communications network 3140 may comprise other computing objects and computing devices that provide services to the system of FIG. 31, and/or may represent multiple interconnected networks, which are not shown. Each computing object 3110, 3112, etc. or computing object or device 3120, 3122, 3124, 3126, 3128, etc. can also contain an application, such as applications 3130, 3132, 3134, 3136, 3138, that might make use of an API, or other object, software, firmware and/or hardware, suitable for communication with or implementation of the design apparatus and associated mechanisms in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 31, as a non-limiting example, computing objects or devices 3120, 3122, 3124, 3126, 3128, etc. can be thought of as clients and computing objects 3110, 3112, etc. can be thought of as servers where computing objects 3110, 3112, etc., acting as servers provide data services, such as receiving data from client computing objects or devices 3120, 3122, 3124, 3126, 3128, etc., storing of data, processing of data, transmitting data to client computing objects or devices 3120, 3122, 3124, 3126, 3128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 3140 or bus is the Internet, for example, the computing objects 3110, 3112, etc. can be Web servers with which other computing objects or devices 3120, 3122, 3124, 3126, 3128, etc. communicate via any of a number of known protocols, such as the hypertext transfer protocol (HTTP). Computing objects 3110, 3112, etc. acting as servers may also serve as clients, e.g., computing objects or devices 3120, 3122, 3124, 3126, 3128, etc., as may be characteristic of a distributed computing environment.

Exemplary Computing Device

As mentioned, advantageously, the techniques described herein can be applied to any device where it is desirable to deploy an application, according to a plurality of configurations, to a plurality of devices in an industrial automation environment. It can be understood, therefore, that handheld, portable and other computing devices and computing objects of all kinds are contemplated for use in connection with the various embodiments, i.e., anywhere that where users can access, utilize, or deploy industrial applications. Accordingly, the below general purpose remote computer described below in FIG. 32 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 32:
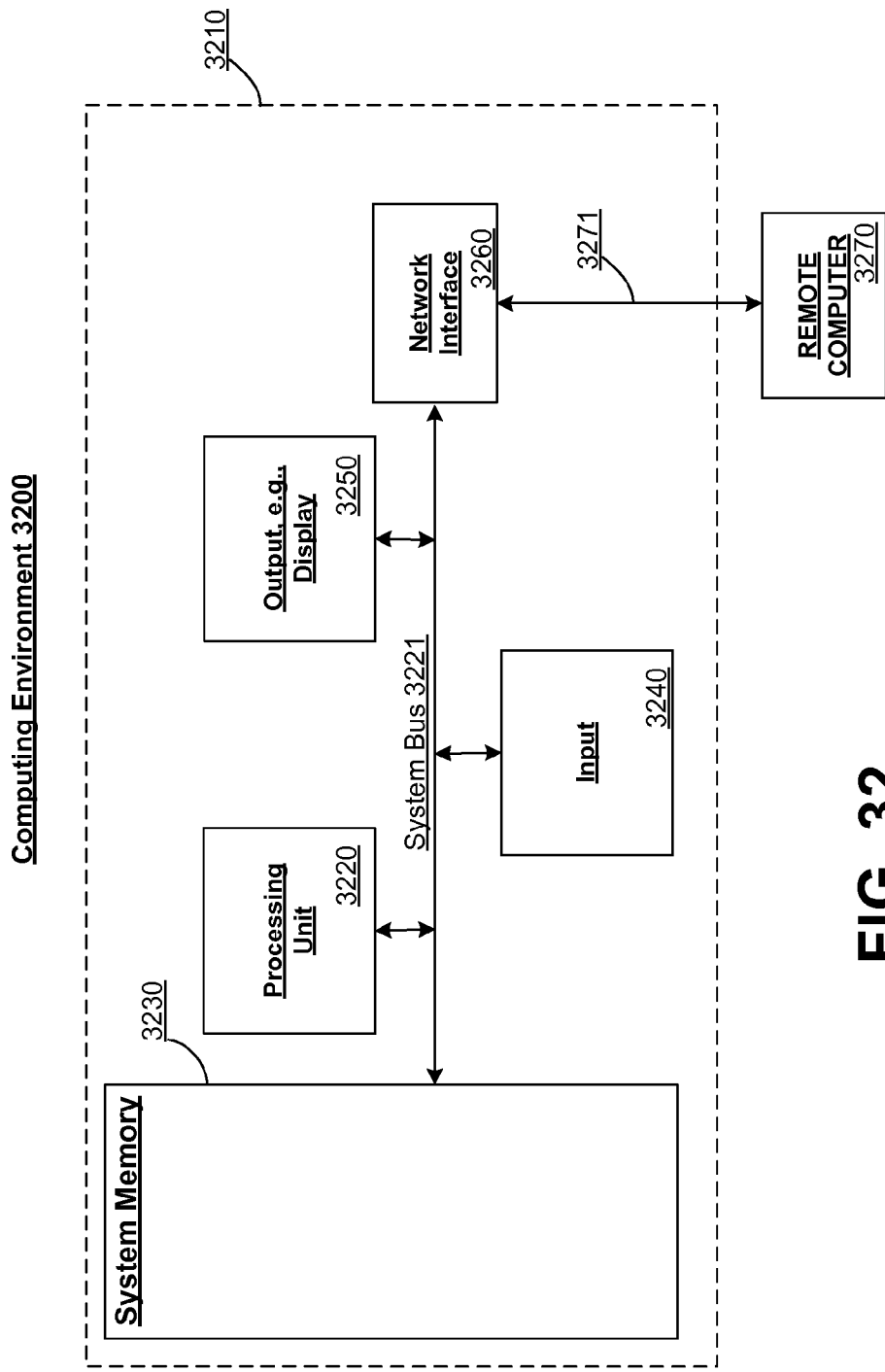
FIG. 32 is a block diagram representing an exemplary non-limiting computing system or operating environment in which one or more aspects of various embodiments described herein can be implemented.

FIG. 32 thus illustrates an example of a suitable computing system environment 3200 in which one or aspects of the embodiments described herein can be implemented, although as made clear above, the computing system environment 3200 is only one example of a suitable computing environment and is not intended to suggest any limitation as to scope of use or functionality. In addition, the computing system environment 3200 is not intended to be interpreted as having any dependency relating to any one or combination of components illustrated in the exemplary computing system environment 3200.

With reference to FIG. 32, an exemplary remote device for implementing one or more embodiments includes a general purpose computing device in the form of a computer 3210. Components of computer 3210 may include, but are not limited to, a processing unit 3220, a system memory 3230, and a system bus 3222 that couples various system components including the system memory to the processing unit 3220.

Computer 3210 typically includes a variety of computer readable media and can be any available media that can be accessed by computer 3210. The system memory 3230 may include computer storage media in the form of volatile and/or nonvolatile memory such as read only memory (ROM) and/or random access memory (RAM). By way of example, and not limitation, system memory 3230 may also include an operating system, application programs, other program modules, and program data. According to a further example, computer 3210 can also include a variety of other media (not shown), which can include, without limitation, RAM, ROM, EEPROM, flash memory or other memory technology, compact disk (CD) ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 3210 through input devices 3240. A monitor or other type of display device is also connected to the system bus 3222 via an interface, such as output interface 3250. In addition to a monitor, computers can also include other peripheral output devices such as speakers and a printer, which may be connected through output interface 3250.

The computer 3210 may operate in a networked or distributed environment using logical connections to one or more other remote computers, such as remote computer 3270. The remote computer 3270 may be a personal computer, a server, a router, a network PC, a peer device or other common network node, or any other remote media consumption or transmission device, and may include any or all of the elements described above relative to the computer 3210. The logical connections depicted in FIG. 32 include a network 3272, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to distribute and/or synchronize a digital object(s) across a distributed computing system.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described herein.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A computer-implemented comprising:
    combining, by a system comprising a processor, a first one-way hash associated with an original state of a first digital object and a second one-way hash associated with a modified state of the first digital object;
    comparing, by the system, the combination of the first one-way hash and the second one-way hash of the first digital object with a previously received third one-way hash and fourth one-way hash combination, wherein the third one-way hash relates to a first state of a second digital object and the fourth one-way hash relates to a second state of the second digital object; and
    determining, by the system, based at least in part on the combination of the first one-way hash and the second one-way hash in relation to the third one-way hash and the fourth one-way hash, whether a second digital object is the same as the first digital object, wherein in response to determining that the first one-way hash and the third one-way hash have the same value and that the second one-way hash and the fourth one-way hash have the same value, deeming, by the system, the first digital object and the second digital object are the same.

2. The method of claim 1, further comprising generating the first one-way hash based at least in part on the content of the first digital object in the original state.

3. The method of claim 1, further comprising generating the second one-way hash based at least in part on the content of the first digital object in the modified state.

4. The method of claim 1, wherein the first digital object is a text file and second digital object is a text file.

5. The method of claim 1, wherein the first digital object is a digital image and second digital object is a digital image.

6. The method of claim 1, further comprising generating the first one-way hash based on the entire content of the first digital object in the original state and the second one-way hash based at least in part on the entire content of the first digital object in the modified state.

7. The method of claim 1, the determining whether a second digital object is the same as the first digital object further comprising:
    in response to a determination that the first one-way hash and the third one-way hash are not of the same value or the second one-way hash and the fourth one-way hash are not of the same value, deeming the first digital object is a first version of a digital object and the second digital object is a second version of the digital object, wherein the first version of the digital object and the second version of the digital object are disparate.

8. A system comprising:
    a processor; and
    a memory that comprises components that are executable by the processor, the components comprising:
    a first one-way hash associated with an original state of a first digital object;
    a second one-way hash associated with a modified state of the first digital object;
    a third one-way hash associated with an original state of a second digital object;
    a fourth one-way hash associated with a modified state of the second digital object;
    a determination component configured to:
    compare a value of the first one-way hash and a value of the third one-way hash;
    compare a value of the second one-way hash and a value of the fourth one-way hash; and
    determine whether the first digital object and the second digital object are the same, wherein in response to a determination that the first one-way hash and the third one-way hash have the same value and that the second one-way hash and the fourth one-way hash have the same value, the determination component is further configured to deem the first digital object and the second digital object are the same.

9. The system of claim 8, wherein the first one-way hash is generated based at least in part on the content of the first digital object in the original state.

10. The system of claim 8, wherein the second one-way hash is generated based at least in part on the content of the first digital object in the modified state.

11. The system of claim 8, wherein the determination component is further configured to request further information regarding the first digital object.

12. The system of claim 11, further comprising a directory for storage of the further information regarding the first digital object.

13. The system of claim 12, further comprising an interface configured to display the further information regarding the first digital object.

14. The system of claim 13, wherein the interface is further configured to facilitate selection of the first digital object.

15. The system of claim 8, further comprising an authentication component configured to establish trust between a first device having the first digital object stored thereon and a second device requesting the first digital object.

16. The system of claim 8, wherein in response to a determination that at least one of:
the first one-way hash and the third one-way hash are not of the same value or the second one-way hash and the fourth one-way hash are not of the same value, the determination component is further configured to deem the first digital object is a first version of a digital object and the second digital object is a second version of the digital object, wherein the first version of the digital object and the second version of the digital object are disparate.

17. The system of claim 8, wherein the first digital object is a digital image and the first one-way hash is generated based on a hashing function applied to pixel data from which the first digital object is rendered and the second digital object is a digital image and the third one-way hash is generated based on a hashing function applied to pixel data from which the second digital object is rendered.

18. A non-transitory computer readable storage medium comprising computer executable instructions that, in response to execution, cause a computing system including a processor to perform operations, comprising:
pairing, by the computing system, a first one-way hash associated with an original state of a first digital object and a second one-way hash associated with a modified state of the first digital object;
receiving, by the computing system, a second digital object, the second digital object having associated therewith a pairing comprising a third one-way hash and a fourth one-way hash, wherein the third one-way hash relating to a first state of the second digital object and the fourth one-way hash relates to a second state of the second digital object;
comparing, by the computing system, the first one-way hash with the third one-way hash and further, comparing, by the computing system, the second one-way hash with the fourth one-way hash, wherein the comparing of the first one-way hash with the third one-way hash and the comparing of the second one-way hash with the fourth one-way hash to facilitate determining whether the second digital object is the same as the first digital object; and
deeming, by the computing system, in response to determining that the first one-way hash and the third one-way hash having a same value and to further determining, by the system, that the second one-way hash and the fourth one-way hash having a same value, the first digital object is the same as the second digital object.

19. The computer readable storage medium of claim 18, wherein the first digital object is a text file and second digital object is a text file.

20. The computer readable storage medium of claim 18, the operations further comprising deeming, in response to determining that at least one of the first one-way hash and the third one-way hash do not have the same value or the second one-way hash and the fourth one-way hash do not have the same value, the first digital object and the second digital object are different.

* * * * *